United States Patent
Hori et al.

(10) Patent No.: US 8,386,264 B2
(45) Date of Patent: Feb. 26, 2013

(54) SPEECH DATA RETRIEVAL APPARATUS, SPEECH DATA RETRIEVAL METHOD, SPEECH DATA RETRIEVAL PROGRAM AND COMPUTER USABLE MEDIUM HAVING COMPUTER READABLE SPEECH DATA RETRIEVAL PROGRAM EMBODIED THEREIN

(75) Inventors: Takaaki Hori, Tokyo (JP); I. Lee Hetherington, Cambridge, MA (US); Timothy J. Hazen, Cambridge, MA (US); James R. Glass, Cambridge, MA (US)

(73) Assignees: Nippon Telegraph and Telephone Corporation (JP); Massachusetts Institute of Technology, Cambridge, MA (US)

( * ) Notice: Subject to any disclaimer, the term of this patent is extended or adjusted under 35 U.S.C. 154(b) by 712 days.

(21) Appl. No.: 12/593,636

(22) PCT Filed: Apr. 11, 2008

(86) PCT No.: PCT/JP2008/057554
§ 371 (c)(1),
(2), (4) Date: Jan. 7, 2010

(87) PCT Pub. No.: WO2008/130018
PCT Pub. Date: Oct. 30, 2008

(65) Prior Publication Data
US 2010/0121642 A1    May 13, 2010

Related U.S. Application Data

(60) Provisional application No. 60/911,731, filed on Apr. 13, 2007.

(51) Int. Cl.
*G10L 15/00*    (2006.01)

(52) U.S. Cl. .......................... 704/275; 704/257; 707/769
(58) Field of Classification Search .................. 704/257, 704/275; 707/769
See application file for complete search history.

(56) References Cited

U.S. PATENT DOCUMENTS

| | | | | |
|---|---|---|---|---|
| 6,615,172 | B1 * | 9/2003 | Bennett et al. | 704/257 |
| 7,809,568 | B2 * | 10/2010 | Acero et al. | 704/257 |
| 8,150,872 | B2 * | 4/2012 | Bernard | 707/771 |
| 2004/0117189 | A1 * | 6/2004 | Bennett | 704/270.1 |
| 2005/0010866 | A1 | 1/2005 | Humpleman | |
| 2006/0265222 | A1 | 11/2006 | Chelba et al. | |
| 2007/0106509 | A1 * | 5/2007 | Acero et al. | 704/240 |

FOREIGN PATENT DOCUMENTS

| | | |
|---|---|---|
| EP | 1630705 A | 3/2006 |
| JP | 2001-356794 | 12/2001 |
| JP | 2006-058899 | 3/2006 |
| WO | 2005/010866 A | 2/2005 |

OTHER PUBLICATIONS

Chelba et al., "Soft Indexing of Speech Content for Search in Spoken Documents", Computer Speech and Language, vol. 21, No. 3, Mar. 10, 2007, pp. 458-478.

Mangu et al., "Finding Consensus in Speech Recognition: Word Error Minimization and Other Applications of Confusion Networks", Computer Speech and Language, vol. 14, No. 4, Oct. 1, 2000, pp. 373-400.

Jian Xue et al., "Improved Confusion Network Algorithm and Shortest Path Search from Word Lattice", Acoustics, Speech, and Signal Processing, IEEE International Conference, Mar. 18-23, 2005, vol. 1, pp. 853-856.

Saraclar et al., "Lattice-Based Search for Spoken Utterance Retrieval", Proc. HLT-NAACL, 2004.

Nanjo et al., Minimum Bayes-Risk Decoding Using Wordgraph and Key-Sentence Extraction, IPSJ SIG Technical Reports, Japan, Information Processing Society of Japan, Dec. 22, 2006, vol. 2006, No. 136, pp. 125-130.

\* cited by examiner

*Primary Examiner* — Daniel D Abebe
(74) *Attorney, Agent, or Firm* — Kilpatrick Townsend & Stockton LLP

(57) ABSTRACT

A speech data retrieval apparatus (10) includes a speech database (1), a speech recognition unit (2), a confusion network creation unit (3), an inverted index table creation unit (4), a query input unit (6), a query conversion unit (7) and a label string check unit (8). The speech recognition unit (2) reads speech data from the speech database (1), carries out a speech recognition process with respect to the read speech data, and outputs a result of speech recognition process as a lattice in which a phoneme, a syllable, or a word is a base unit. The confusion network creation unit (3) creates a confusion network based on the output lattice and outputs the result of speech recognition process as the confusion network. The inverted index table creation unit (4) creates an inverted index table based on the output confusion network. The query input unit (6) receives a query input by a user, carries out a speech recognition process with respect to the received query, and outputs a result of speech recognition process as a character string. The query conversion unit (7) converts the output character string into a label string in which a phoneme, a syllable, or a word is a base unit. The label string check unit (8) checks the label string against the inverted index table and retrieves speech data which is included in both of the label string and the speech database (1).

6 Claims, 17 Drawing Sheets

| WORD | LIST OF DOCUMENT ID NUMBERS |
|---|---|
| Tokyo | 1,2,4,7,8 |
| Osaka | 2,8 |
| Kyoto | 3,7 |
| Nara | 5,6 |

| WORD | LIST OF DOCUMENT ID NUMBERS AND APPEARANCE POSITIONS |
|---|---|
| Tokyo | (1,5), (1,12), (2,10), (4,7), (7,1), (8,2), (8,16) |
| Osaka | (2,11), (8,14) |
| Kyoto | (3,3), (7,3) |
| Nara | (5,4), (6,11) |

FIG. 4

| SOURCE NODE NUMBER | DESTINATION NODE NUMBER | LABEL | STARTING TIME [msec] | ENDING TIME [msec] | WEIGHT |
|---|---|---|---|---|---|
| 0 | 1 | A | 0 | 300 | 110 |
| 0 | 2 | B | 0 | 240 | 80 |
| 0 | 3 | C | 0 | 150 | 40 |
| 1 | 4 | E | 300 | 650 | 122 |
| 1 | 5 | F | 300 | 600 | 66 |
| 2 | 5 | A | 240 | 600 | 70 |
| 3 | 5 | A | 150 | 600 | 90 |
| 3 | 6 | D | 150 | 450 | 40 |
| 4 | 7 | H | 650 | 920 | 70 |
| 4 | 8 | H | 650 | 800 | 33 |
| 5 | 8 | G | 600 | 800 | 88 |
| 5 | 10 | G | 600 | 980 | 60 |
| 6 | 9 | F | 450 | 650 | 20 |
| 7 | 11 | I | 920 | 1100 | 80 |
| 8 | 11 | J | 800 | 1100 | 99 |
| 9 | 10 | H | 650 | 920 | 44 |
| 10 | 11 | I | 920 | 1100 | 107 |

FIG. 5

| LABEL l[e] | LIST OF ARCS ( id[e], k[e], n[e], p(e|k[e]), f(k[e])) |
|---|---|
| A | (1,0,1,0.4,1), (1,2,5,1,0.4), (1,3,5,0.5,0.3) |
| B | (1,0,2,0.3,1) |
| C | (1,0,3,0.3,1) |
| D | (1,3,6,0.5,0.3) |
| E | (1,1,4,0.2,0.4) |
| F | (1,1,5,0.8,0.4), (1,6,9,1,0.15) |
| G | (1,5,8,0.4,0.77), (1,5,10,0.6,0.77) |
| H | (1,4,7,0.5,0.08), (1,4,8,0.5,0.08), (1,9,10,1,0.15) |
| I | (1,7,11,1,0.04), (1,10,11,1,0.612) |
| J | (1,8,11,1,0.348) |

FIG. 9
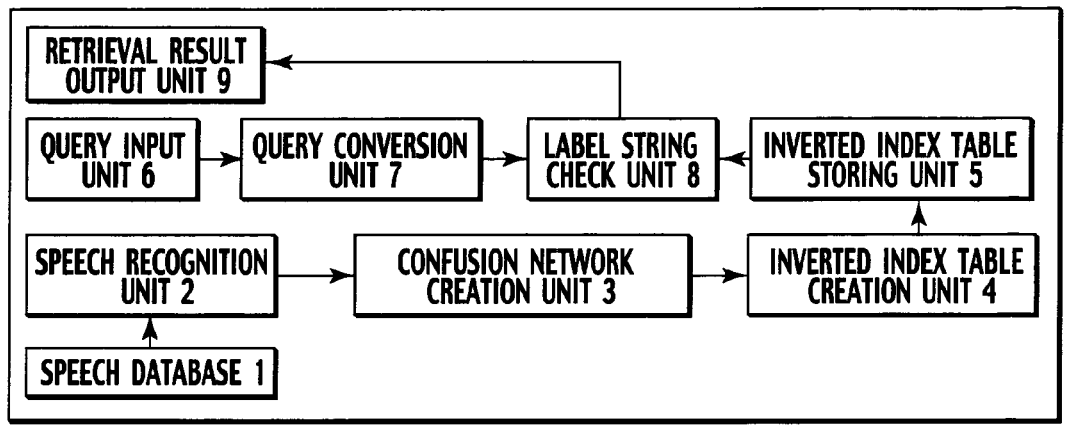
FIG. 10
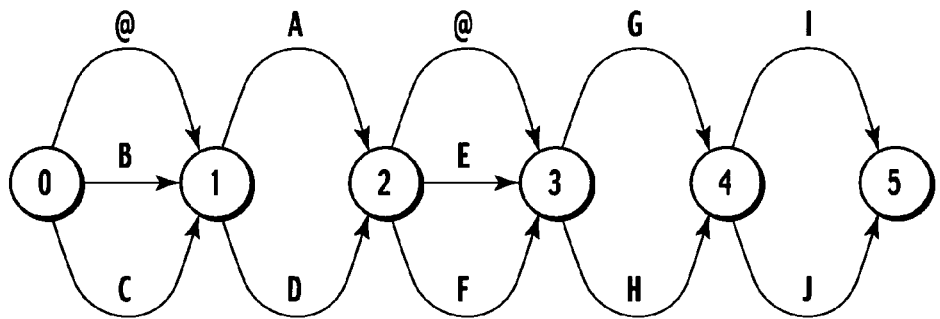
FIG. 11
| SOURCE NODE NUMBER | DESTINATION NODE NUMBER | LABEL | POSTERIOR PROBABILITY |
|---|---|---|---|
| 0 | 1 | @ | 0.4 |
| 0 | 1 | B | 0.2 |
| 0 | 1 | C | 0.4 |
| 1 | 2 | A | 0.5 |
| 1 | 2 | D | 0.5 |
| 2 | 3 | @ | 0.2 |
| 2 | 3 | E | 0.4 |
| 2 | 3 | F | 0.4 |
| 3 | 4 | G | 0.6 |
| 3 | 4 | H | 0.4 |
| 4 | 5 | I | 0.5 |
| 4 | 5 | J | 0.5 |

FIG. 12
| LABEL | SET OF ARCS |
|---|---|
| @ | (1,0,0.4), (1,2,0.2) |
| A | (1,1,0.4) |
| B | (1,0,0.2) |
| C | (1,0,0.4) |
| D | (1,1,0.5) |
| E | (1,2,0.4) |
| F | (1,2,0.4) |
| G | (1,3,0.6) |
| H | (1,3,0.4) |
| I | (1,4,0.5) |
| J | (1,4,0.5) |
FIG. 13A
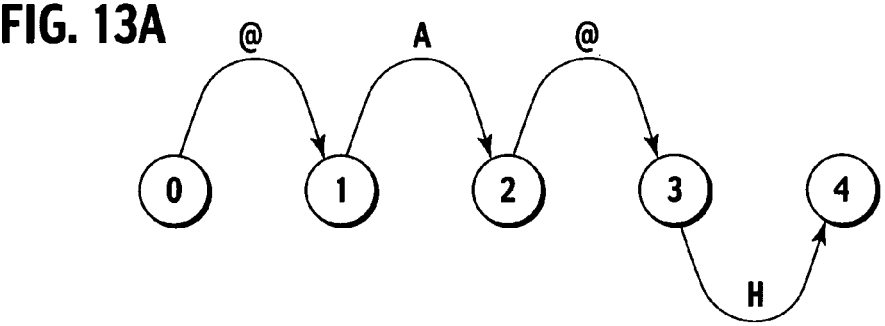
FIG. 13B
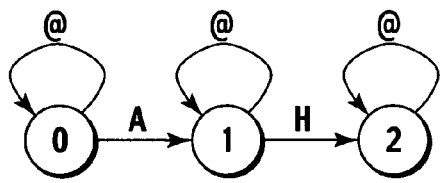
FIG. 13C

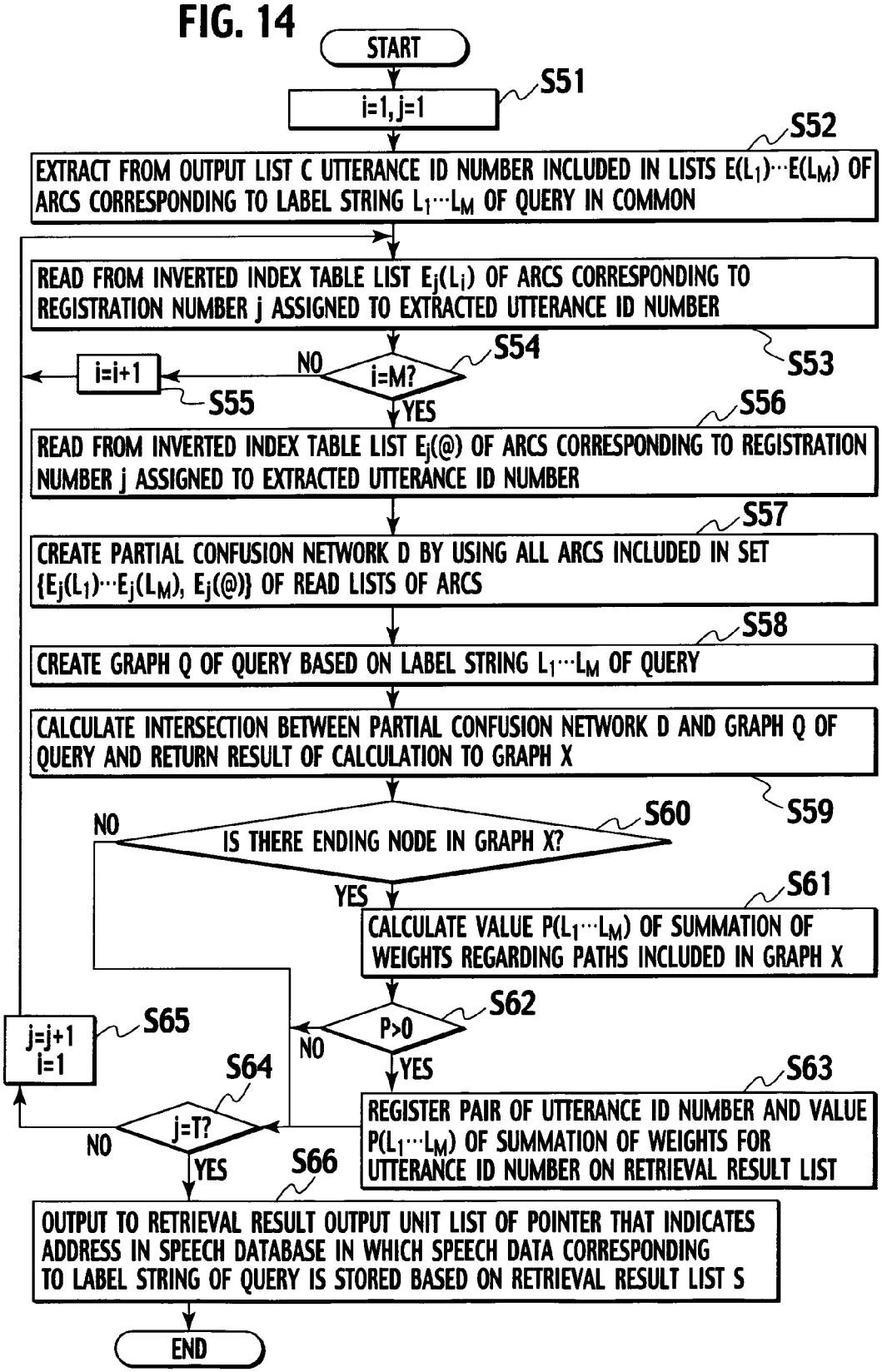

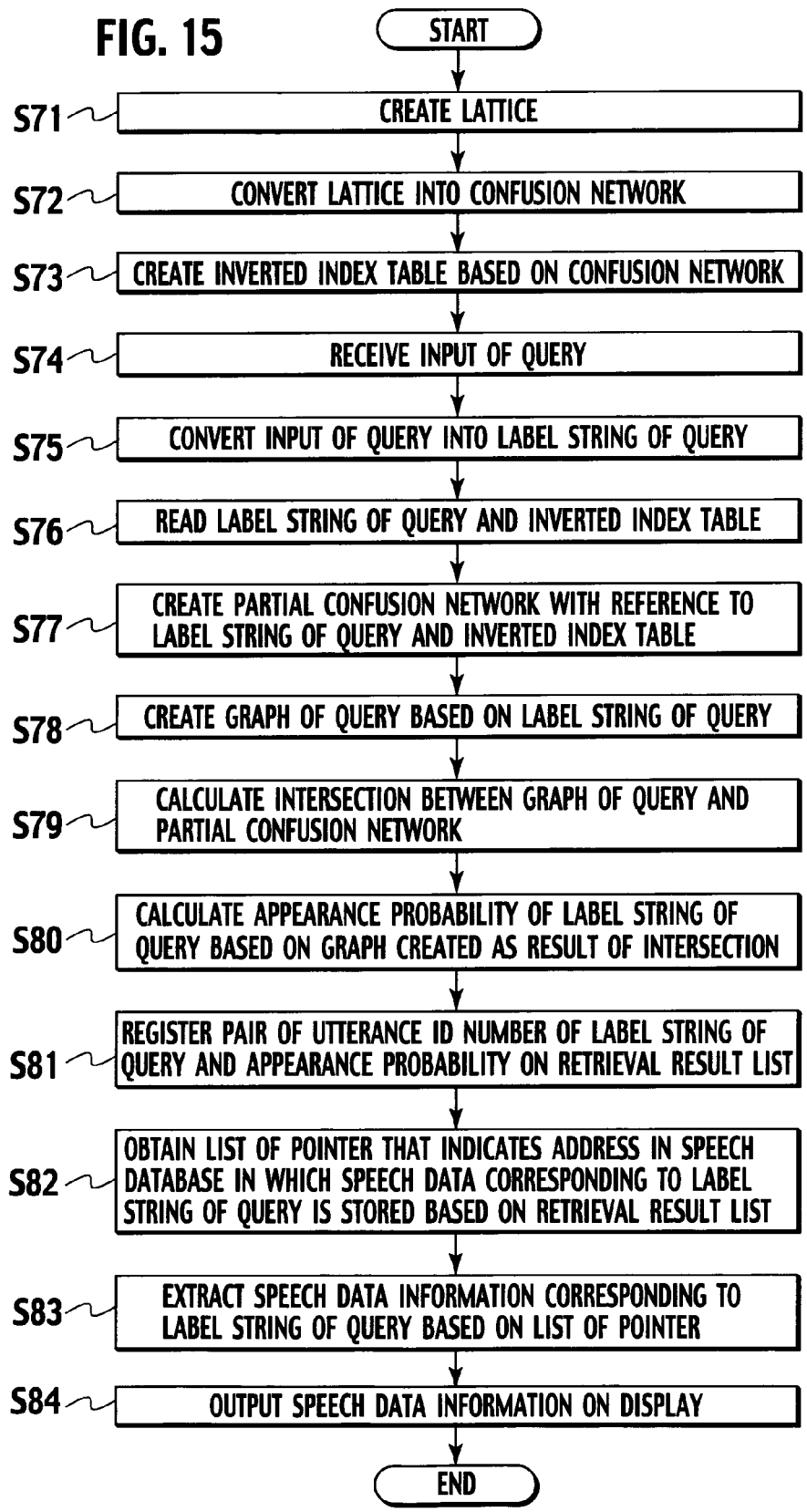

FIG. 16

| | WORD STRING | WORD LATTICE | WORD CONFUSION NETWORK | PHONEME LATTICE | PHONEME CONFUSION NETWORK |
|---|---|---|---|---|---|
| FILE SIZE OF INVERTED INDEX TABLE [MB] | 0.8 | 6.7 | 2.4 | 14.0 | 5.0 |
| F-SCORE [%] | 70.3 | 77.1 | 77.6 | 78.5 | 80.2 |
| F-SCORE FOR REGISTED WORD QUERY (IV QUERY) | 73.1 | 80.0 | 80.4 | 79.8 | 81.0 |
| F-SCORE FOR NON-REGISTED WORD QUERY (OOV QUERY) | 0 | 0 | 0 | 54.1 | 66.7 |

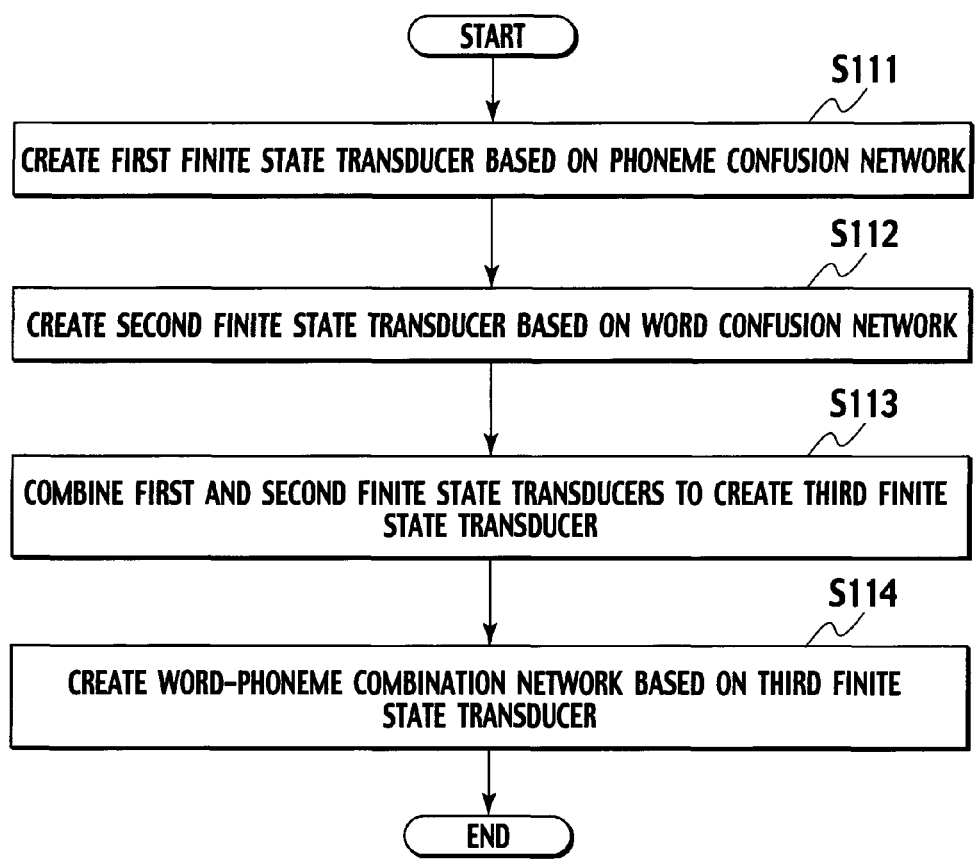

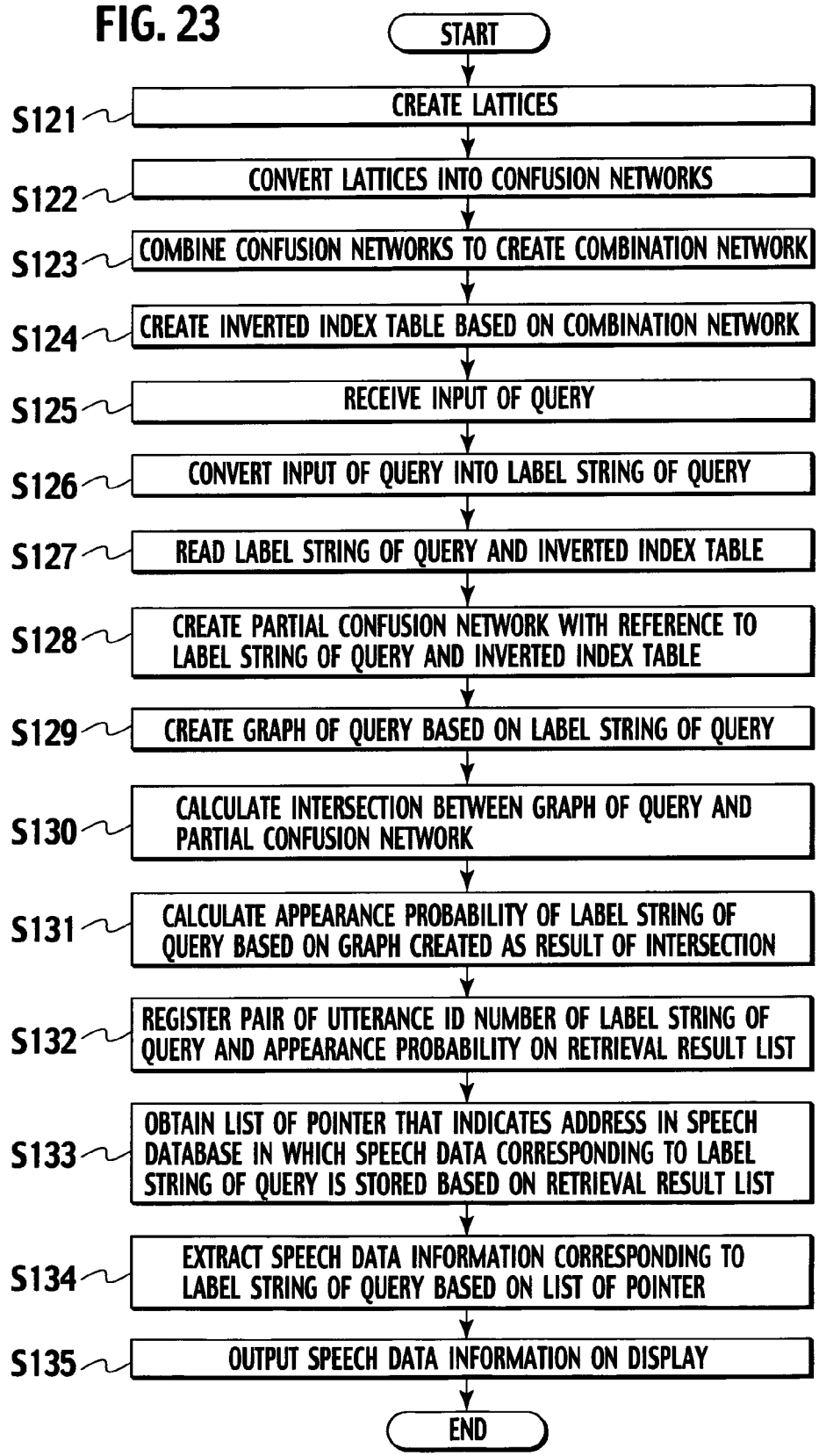

SPEECH DATA RETRIEVAL APPARATUS, SPEECH DATA RETRIEVAL METHOD, SPEECH DATA RETRIEVAL PROGRAM AND COMPUTER USABLE MEDIUM HAVING COMPUTER READABLE SPEECH DATA RETRIEVAL PROGRAM EMBODIED THEREIN

CROSS REFERENCE TO RELATED APPLICATIONS

This application is the U.S. National Phase of PCT/JP2008/057554 filed on Apr. 11, 2008 which claims the benefit U.S. Provisional Application No. 60/911,731 filed on Apr. 13, 2007, both of which are incorporated herein by reference.

TECHNICAL FIELD

The present invention relates to a speech data retrieval apparatus, a speech data retrieval method and a speech data retrieval program for retrieving speech data corresponding to a query input from a user, from plural pieces of speech data stored in a speech database, and relates to a computer usable medium having the computer readable speech data retrieval program embodied therein.

BACKGROUND ART

As one of methods for retrieving a text, a method for creating an inverted index table has been known. In a case where we assume a word as a retrieval unit, the inverted index table is created in the following steps: (1) one or more document ID numbers assigned to one or more documents each of which includes a target word are related to the target word; and (2) a pair of the target word and a list of the one or more document ID numbers is stored in a database. In a case where an inverted index table is previously stored in a speech data retrieval apparatus, when a user inputs a target word into the speech data retrieval apparatus as a query, the speech data retrieval apparatus can instantaneously obtain one or more document ID numbers assigned to one or more documents each of which includes the input target word therein, with reference to the inverted index table, and provide the one or more document ID numbers to the user.

As shown in FIG. 1, an inverted index table consists of plural data sets. Each data set includes a word and a list of document ID numbers. For example, a word "Osaka" is included in two documents "2" and "8".

When a user inputs a word string into a speech data retrieval apparatus as a query, the speech data retrieval apparatus divides the input word string into words and retrieves one or more document ID numbers assigned to one or more documents each of which includes the words therein. Then, in order to check adjacency between words, the speech data retrieval apparatus obtains one or more document ID numbers assigned to one or more documents each of which includes therein the words that are arranged in order of appearances of words in the input word string, with reference to an inverted index table, and provides the one or more document ID numbers to the user. It is noted that an appearance position of each word in a target word string with a document ID number may be stored in the inverted index table so that the speech data retrieval apparatus easily checks the adjacency between words.

As shown in FIG. 2, an inverted index table consists of plural data sets. Each data set includes a word and a pair of a document ID number and an appearance position of the word.

For example, a word "Osaka" appears in an eleventh position in a document "2" and a fourteenth position in a document "8". In a case of retrieving one or more documents each of which includes a word string "Tokyo Osaka" therein, the speech data retrieval apparatus retrieves one or more documents each of which includes both words "Tokyo" and "Osaka" therein, with reference to the inverted index table, and checks whether or not an appearance position of the word "Tokyo" is adjacent to one of the word "Osaka", with respect to each retrieved document. More specifically, the speech data retrieval apparatus retrieves the documents "2" and "8" each of which includes both words "Tokyo" and "Osaka" therein, with reference to the inverted index table. Then, the speech data retrieval apparatus determines that a document including the word string "Tokyo Osaka" therein is the document "2" because the words "Tokyo" and "Osaka" appear in a tenth position and an eleventh position in the document "2" and the words "Tokyo" and "Osaka" appear in a sixteenth position and a fourteenth position in the document "8".

A non-patent document 1 (M. Saraclar and R. Sproat "Lattice-Based Search for Spoken Utterance Retrieval" *Proc. HLT-NAACL,* 2004) discloses a method for retrieving speech data by using an inverted index table. More specifically, the non-patent document 1 discloses a method for creating the inverted index table by using a lattice of spoken utterance created as a result of speech recognition in order to retrieve the speech data quickly. In this method, a spoken utterance is assumed as a document including a target word therein. Of course, in this method, a phoneme or a syllable may be set as a retrieval unit instead of setting a word as the retrieval unit.

A lattice is a graph that shows one or more words, phonemes or syllables to be one or more candidates forming a sentence of spoken utterance as a digraph (see FIG. 3). It is noted that numerals "0" to "11" and symbols "A" to "J" shown in FIG. 3 respectively represent node numbers and arc labels such as words, phonemes or syllables. A sequence of labels which are respectively assigned to arcs on one path from a leftmost starting node to a rightmost ending node indicates one hypothesis for a sentence of spoken utterance created as a result of speech recognition. In addition to the label, a weight representing likelihood of the label, a starting time and an ending time in a speech segment corresponding to the label are assigned to each arc. The lattice shown in FIG. 3 is stored in a speech data retrieval apparatus as tabular data shown in FIG. 4. A table shown in FIG. 4 represents the relation of connections between the nodes and the arcs in the lattice shown in FIG. 3.

In the method of the non-patent document 1, a speech data retrieval apparatus creates an inverted index table in which a pair of a label and a list of all arcs corresponding to the label is included (see FIG. 5). For example, if there is an arc e in a lattice, the speech data retrieval apparatus registers a data set $(id[e], k[e], n[e], p(e|k[e]), f(k[e]))$ on a list of arcs corresponding to a label $l[e]$ in an inverted index table, where a variable $id[e]$ represents an utterance ID number assigned to the lattice in which the arc e is included, a variable $k[e]$ represents a number of source node located in a source of the arc e, a variable $n[e]$ represents a number of destination node located in a destination of the arc e, a variable $p(e|k[e])$ represents a probability that the arc e is selected from among arcs going out of the node $k[e]$, a variable $f(k[e])$ represents a probability that the node $k[e]$ appears in all paths of the lattice.

Values of the probabilities $p(e|k[e])$ and $f(k[e])$ are calculated based on weights of arcs in a lattice. In a case where a weight of path from one node to another node in a lattice is given by the product of weights of arcs on the path, the value of probability f(k[e]) is given by dividing the summation of weights of paths from a starting node to an ending node through the node k[e] in the lattice by the summation of weights of all paths from the starting node to the ending node. The value of probability p(e|k[e]) is given by dividing the summation of weights of paths from the node k[e] to the ending node through the arc e in the lattice by the summation of weights of all paths from the node k[e] to the ending node.

In a weighted directed acyclic graph, the summation $\alpha(v)$ of weights of all paths from a starting node to a given node v in the graph is effectively calculated according to Forward algorithm. The summation $\beta(v)$ of weights of all paths from a given node v to an ending node in the graph is effectively calculated according to Backward algorithm.

First, we will describe the Forward algorithm below. The speech data retrieval apparatus simultaneously calculates the summation $\alpha(v)$ of weights of all paths from a starting node to a given node v in a graph G according to the Forward algorithm and the summation a of weights of all paths from the starting node to an ending node in the graph G. The Forward algorithm is as follows,

| Forward (G) | |
|---|---|
| 1 | S←I |
| 2 | Q←I |
| 3 | for each q∈I do |
| 4 | $\alpha$(q)=1 |
| 5 | while S≠Φ do |
| 6 | q←HEAD(S) |
| 7 | DEQUEUE(S) |
| 8 | for each e∈E[q] do |
| 9 | $\alpha$(n[e])←$\alpha$(n[e])+f(q)*w(e) |
| 10 | If not n[e]∈Q then |
| 11 | Q←Q∪{n[e]} |
| 12 | ENQUEUE(S, n[e]) |
| 13 | $\alpha$←0 |
| 14 | for each q∈F do |
| 15 | $\alpha$←$\alpha$+$\alpha$(q) | where the graph G has a set V of nodes, a set E of arcs, a set I of starting node and a set F of ending node, a set E(v) of arcs is a set of arcs going out of a node v, k[e] is a source node of arc e, n[e] is a destination node of arc e, l[e] is a label of arc e, w[e] is a weight of arc e, HEAD(S) is a function for returning a head element of queue S, DEQUEUE(S) is a function for deleting a head element of queue S, and ENQUEUE(S, x) is a function for inserting an element x into an end position of queue S.

Next, we will describe the Backward algorithm below. The speech data retrieval apparatus simultaneously calculates the summation $\beta$ (v) of weights of all paths from a given node v to a destination node in a graph G according to the Backward algorithm and the summation $\beta$ of weights of all paths from the starting node to an ending node in the graph G. The Backward algorithm is as follows,

| Backward (G) | |
|---|---|
| 1 | S←F |
| 2 | Q←F |
| 3 | for each q∈F do |
| 4 | $\beta$(q)=1 |
| 5 | while S≠Φ do |
| 6 | q←HEAD(S) |
| 7 | DEQUEUE(S) |
| 8 | for each e∈H[q] do |
| 9 | $\beta$(k[e])←$\beta$(k[e])+w(e)*$\beta$(q) |
| 10 | if not k[e]∈Q then |
| 11 | Q←Q∪{k[e]} |
| 12 | ENQUEUE(S, k[e]) |
| 13 | $\beta$←0 |
| 14 | for each q∈I do |
| 15 | $\beta$←$\beta$+$\beta$(q) | where the graph G has a set V of nodes, a set H of arcs, a set I of starting node and a set F of ending node, a set H(v) of arcs is a set of arcs coming in a node v, k[e] is a source node of arc e, n[e] is a destination node of arc e, l[e] is a label of arc e, w[e] is a weight of arc e, HEAD(S) is a function for returning a head element of queue S, DEQUEUE(S) is a function for deleting a head element of queue S, and ENQUEUE(S, x) is a function for inserting an element x into an end position of queue S.

Thus, the summation of weights of paths from the starting node to the ending node through the node k[e] is given by $\alpha(k[e])*\beta(k[e])$. The summation of weights of all paths from the starting node to the ending node is given by $\beta$ (starting node). The summation of weights of paths from the node k[e] to the ending node through the arc e is given by $w[e]*\beta(n[e])$. The summation of weights of all paths from the node k[e] to the ending node is given by $\beta$ (k[e]). Therefore, the values of the probabilities p(e|k[e]) and f(k[e]) are calculated by using the above-described values according to as follows, $$f(k[e])=\alpha(k[e])*\beta(k[e])/\beta(\text{starting node})$$

$$p(e|k[e])=w[e]*\beta(n[e])/\beta(k[e])$$

If an arc string $e_1, e_2, \ldots, e_M$ corresponding to a label string $L_1, L_2, \ldots, L_M$ of query is found on a lattice of spoken utterance, an appearance probability is calculated according to as follows, $$P(e_1, e_2, \ldots, e_M)= f(k[e_1])*p(e_1|k[e_1])*p(e_2|k[e_2])* \ldots *p(e_M|k[e_M])$$

where the appearance probability P ($e_1, e_2, \ldots, e_M$) is a probability that an node $k[e_1]$ appears and a path representing the arc string $e_1, e_2, \ldots e_M$ passes through an arc $e_1$ from the node $k[e_1]$, an arc $e_2$ from a node $k[e_2]$, ..., and an arc $e_M$ from a node $k[e_M]$. It is noted that $n[e_{m-1}]$ is $k[e_m]$ and $l[e_m]$ is $L_m (1 \leq m \leq M)$ in the arc string $e_1, e_2, \ldots, e_M$. The summation of appearance probabilities of all arc strings corresponding to a label string of query on a lattice of spoken utterance becomes an appearance probability of the label string of the query in the spoken utterance.

In a process of retrieving an arc string corresponding to a label string of query, the speech data retrieval apparatus may assign each utterance ID number in a list of utterance ID numbers to an appearance probability of an arc string corresponding to a label string of query in a spoken utterance associated with the each utterance ID number, and then sort the list of utterance ID numbers, with reference to the assigned appearance probabilities. Further, the speech data retrieval apparatus may delete from a list of utterance ID numbers an utterance ID number to which a relatively low appearance probability is assigned.

Next, with reference to FIG. 6, we will describe a method for creating an inverted index table based on N lattices $G_1, \ldots, G_N$ for all spoken utterances to be retrieved.

In step S1, the speech data retrieval apparatus assigns "1" to arguments i and j. In step S2, the speech data retrieval apparatus calculates the summation $\alpha(k[e_j])$ of weights of all paths from a starting node to a source node $k[e_j]$ for an arc $e_j$ in a lattice $G_i$ according to the Forward algorithm, and calculates the summation $\beta(k[e_j])$ of weights of all paths from the source node $k[e_j]$ to a destination node in the lattice $G_i$ according to the Backward algorithm. In step S3, the speech data retrieval apparatus calculates a data set $(id[e_j], k[e_j], n[e_j], p(e_j|k[e_j]), f(k[e_j]))$ for the arc $e_j$ in the lattice $G_i$. In step S4, the speech data retrieval apparatus registers the data set (id $[e_j], k[e_j], n[e_j], p(e_j|k[e_j]), f(k[e_j]))$ on a list $E(l[e_j])$ of arcs associated with a label $l[e_j]$ in an inverted index table of the lattice $G_i$. In step S5, the speech data retrieval apparatus determines whether or not the value of argument j is equal to the total number M of arcs in the lattice $G_i$. If the value of argument j is not equal to the total number M of arcs, the speech data retrieval apparatus carries out a process of step S6. If the value of argument j is equal to the total number M of arcs, the speech data retrieval apparatus carries out a process of step S7. In step S6, the speech data retrieval apparatus increments the value of argument j by one, and then returns to the process of step S2. In step S7, the speech data retrieval apparatus determines whether or not the value of argument i is equal to the total number N of lattices. If the value of argument i is not equal to the total number N of lattices, the speech data retrieval apparatus carries out a process of step S8. If the value of argument i is equal to the total number N of lattices, the speech data retrieval apparatus finishes the series of processes. In step S8, the speech data retrieval apparatus increments the value of argument i by one and assigns "1" to the argument j, and then returns to the process of step S2.

According to the above-described method, for example, the speech data retrieval apparatus creates the inverted index table shown in FIG. 5 from the lattice shown in FIG. 3.

Next, with reference to FIGS. 7 and 8, we will describe a method for effectively retrieving from an inverted index table a list of one or more utterance ID number assigned to one or more lattices in which an arc string matching a label string $L_1, \ldots, L_M$ of query is included, with respect to lattices $G_1, \ldots, G_N$. First, with reference to FIG. 7, we will describe a method for retrieving one or more lattices in which all labels forming the label string $L_1, \ldots, L_M$ of the query are included, and retrieving a list of one or more utterance ID numbers assigned to the retrieved one or more lattices. It is noted that an order of appearances of labels is not considered in this method.

In step S11, the speech data retrieval apparatus assigns "1", "1" and "2" to arguments i, j and k. In step S12, with respect to a label $L_i$, the speech data retrieval apparatus obtains a list $E(L_i)$ of arcs from an inverted index table. In step S13, the speech data retrieval apparatus reads from the list $E(L_i)$ of arcs an utterance ID number $id[e_j]$ corresponding to an arc $e_j$ included in j-th data set, and registers the read utterance ID number $id[e_j]$ on a list $R_{ij}$ ($1 \leq j \leq S$: S is the total number of data sets included in the list $E(L_i)$ of arcs). It is noted that the speech data retrieval apparatus deletes an utterance ID number duplicated in the list $R_{ij}$. In step S14, the speech data retrieval apparatus determines whether or not the value of argument j is equal to the total number S of data sets included in the list $E(L_i)$ of arcs. If the value of argument j is not equal to the total number S of data sets, the speech data retrieval apparatus carries out a process of step S15. If the value of argument j is equal to the total number S of data sets, the speech data retrieval apparatus carries out a process of step S16. In step S15, the speech data retrieval apparatus increments the value of argument j by one, and returns to the process of step S13. In step S16, the speech data retrieval apparatus determines whether or not the value of argument i is equal to the total number M of labels. If the value of argument i is not equal to the total number M of labels, the speech data retrieval apparatus carries out a process of step S17. If the value of argument i is equal to the total number M of labels, the speech data retrieval apparatus carries out a process of step S18. In step S17, the speech data retrieval apparatus increments the value of argument i by one and assigns "1" to the argument j, and then returns to the process of step S12.

In step S18, the speech data retrieval apparatus registers on an output list C one or more utterance ID numbers registered on the list $R_{1j}$ ($1 \leq j \leq S$). In step S19, the speech data retrieval apparatus determines whether or not the value of argument i is "1". If the value of argument i is "1", the speech data retrieval apparatus finishes a series of processes. If the value of argument i is not "1", the speech data retrieval apparatus carries out a process of step S20. In step S20, the speech data retrieval apparatus determines whether or not there are in the list $R_{kj}$ ($1 \leq j \leq S$) one or more utterance ID numbers identical to one or more utterance ID numbers included in the output list C. If there are not one or more utterance ID numbers identical to one or more utterance ID numbers included in the output list C, the speech data retrieval apparatus carries out a process of step S21. If there are one or more utterance ID numbers identical to one or more utterance ID numbers included in the output list C, the speech data retrieval apparatus carries out a process of step S22. In step S21, the speech data retrieval apparatus empties the output list C and finishes the series of processes. In step S22, the speech data retrieval apparatus deletes from the output list C an utterance ID number which is not identical to any utterance ID numbers included in the list $R_{kj}$. In step S23, the speech data retrieval apparatus determines whether or not the value of argument k is equal to the total number M of labels. If the value of argument k is not equal to the total number M of labels, the speech data retrieval apparatus carries out a process of step S24. If the value of argument k is equal to the total number M of labels, the speech data retrieval apparatus finishes the series of processes. In step S24, the speech data retrieval apparatus increments the value of argument k by one, and then returns to the process of step S20.

Next, with reference to FIG. 8, we will describe a method for determining whether or not an order of appearances of labels, which are retrieved according to the procedure of FIG. 7, matches one of labels of the query, by each of lattices in which all labels forming the label strings $L_1, \ldots, L_M$ of the query are included. It is noted that the summation of appearance probabilities of arc strings each of which is obtained as the result that the order of appearances of labels matches that of labels of the query is calculated in parallel in this method. More specifically, this method uses the fact that the summation of appearance probabilities becomes "0" when there are not the arc strings.

In step S31, the speech data retrieval apparatus assigns "1", "1" and "1" to arguments i, j and m. In step S32, the speech data retrieval apparatus reads from the output list C a list $E_j(L_i)$ of arcs corresponding to a resister number j assigned to an utterance ID number included in the output list C in the order of increasing an integer number from "1". In step S33, the speech data retrieval apparatus determines whether or not the value of argument i is equal to the total number M of labels. If the value of argument i is not equal to the total number M of labels, the speech data retrieval apparatus carries out a process of step S34. If the value of argument i is equal to the total number M of labels, the speech data retrieval apparatus carries out a process of step S35. In step S34, the speech data retrieval apparatus increments the value of argument i by one and then returns to the process of step S32. In step S35, the speech data retrieval apparatus calculates the following equation $F_m(e_{jm})=f(k[e_{jm}])*p(e_{jm}|k[e_{jm}])$, with respect to an arc $e_{jm}$ included in each data set in the list $E_j(L_m)$ of arcs. In step S36, the speech data retrieval apparatus determines whether or not the value of argument m is equal to the total number M of labels. If the value of argument m is equal to the total number M of labels, the speech data retrieval apparatus carries out a process of step S37. If the value of argument m is not equal to the total number M of labels, the speech data retrieval apparatus carries out a process of step S39. In step S37, the speech data retrieval apparatus determines whether or not the value of argument j is equal to the maximum value T of register number. If the value of argument j is not equal to the maximum value T of register number, the speech data retrieval apparatus carries out a process of step S38. If the value of argument j is equal to the maximum value T of register number, the speech data retrieval apparatus carries out a process of step S42. In step S38, the speech data retrieval apparatus increments the value of argument j by one and then returns to the process of step S32. In step S39, the speech data retrieval apparatus increments the value of argument m by one. In step S40, the speech data retrieval apparatus calculates the following equation $$F_m(e_{jm}) = \sum_{e \in E_j(L_{m-1}): n[e]=k[e_{jm}]} F_{m-1}(e) * p(e_{jm}|k[e_{jm}]),$$

with respect to an arc $e_{jm}$ included in each data set in a list $E_j(L_m)$ of arcs. The speech data retrieval apparatus calculates the above-described equation as $F_{m-1}(e)=0$ when $F_{m-1}$ is not calculated. In step S41, the speech data retrieval apparatus determines whether or not the value of argument m is equal to the total number M of labels. If the value of argument m is not equal to the total number M of labels, the speech data retrieval apparatus carries out the process of step S39. If the value of argument m is equal to the total number M of labels, the speech data retrieval apparatus carries out the process of step S42. In step S42, the speech data retrieval apparatus calculates a probability $$P(L_1, \ldots, L_M) = \sum_{e \in E_j(L_m)} F_M(e)$$

that a label string $L_1, \ldots, L_M$ is included in an utterance j. In step S43, the speech data retrieval apparatus determines whether or not the probability $P(L_1, \ldots, L_M)$ is more than "0". If the probability $P(L_1, \ldots, L_M)$ is more than "0", the speech data retrieval apparatus carries out a process of step S44. If the probability $P(L_1, \ldots, L_M)$ is not more than "0", the speech data retrieval apparatus carries out a process of step S45. In step S44, the speech data retrieval apparatus registers on a list S a pair of the utterance ID number and the probability $P(L_1, \ldots, L_M)$. In step S45, the speech data retrieval apparatus determines whether or not the value of argument j is equal to the maximum value T of register number. If the value of argument j is not equal to the maximum value T of register number, the speech data retrieval apparatus carries out the process of step S38. If the value of argument j is equal to the maximum value T of register number, the speech data retrieval apparatus finishes the series of processes.

In a conventional method for retrieving speech data, the speech data retrieval apparatus creates an inverted index table by means of a lattice obtained based on plural pieces of speech data registered in a speech database as a result of speech recognition. However, in this conventional method, there is a problem that the file size of inverted index table increases because the lattice includes redundant arcs therein. Further, the speech data retrieval apparatus can not retrieve a word string including adjacency between words which is not permitted in a language model used in the speech recognition because the lattice includes only adjacency between words which is permitted in the language model, with respect to a candidate word. Therefore, there is a problem that a retrieval performance deteriorates in the conventional method.

DISCLOSURE OF INVENTION

A first object of the present invention is to provide a speech data retrieval apparatus, a speech data retrieval method and a speech data retrieval program capable of reducing the file size of inverted index table, and to provide a computer usable medium having the computer readable speech data retrieval program embodied therein.

A second object of the present invention is to provide a speech data retrieval apparatus, a speech data retrieval method and a speech data retrieval program capable of retrieving speech data with high-accuracy without being constrained by a language model used in speech recognition, and to provide a computer usable medium having the computer readable speech data retrieval program embodied therein.

A third object of the present invention is to provide a speech data retrieval apparatus, a speech data retrieval method and a speech data retrieval program capable of effectively retrieving an inverted index table when using a confusion network created to reduce the file size of inverted index table, and to provide a computer usable medium having the computer readable speech data retrieval program embodied therein.

In order to achieve the above objects, there is provided a speech data retrieval apparatus comprising: a speech database including plural pieces of speech data therein; a speech recognition unit configured to read speech data from the speech database, carry out a speech recognition process with respect to the read speech data, and output a result of speech recognition process as a lattice in which a phoneme, a syllable, or a word is a base unit; a confusion network creation unit configured to create a confusion network based on the lattice from the speech recognition unit and output the result of speech recognition process as the confusion network; an inverted index table creation unit configured to create an inverted index table based on the confusion network from the confusion network creation unit; a query input unit configured to receive a query input by a user, carry out a speech recognition process with respect to the received query, and output a result of speech recognition process as a character string; a query conversion unit configured to convert the character string from the query input unit into a label string in which a phoneme, a syllable, or a word is a base unit; and a label string check unit configured to check the label string from the query conversion unit against the inverted index table from the inverted index table creation unit, retrieve speech data which is included in both of the label string and the speech database, and output a list of pointer which indicates an address in the speech database in which the retrieved speech data is stored.

According to the present invention, in comparison with the conventional speech data retrieval apparatus, the speech data retrieval apparatus can reduce the file size of inverted index table. Further, in comparison with the conventional speech data retrieval apparatus, the speech data retrieval apparatus can retrieve speech data with high-accuracy without being constrained by a language mode used in speech recognition.

In a preferred embodiment of the present invention, the label string check unit creates a partial confusion network formed by one or more arcs assigned to one or more labels included in the label string, with reference to the inverted index table, represents the label string by one-dimensional array graph and then assigns to each node in the one-dimensional array graph an arc returning to the each node to create a graph of query, and calculates an intersection between the partial confusion network and the graph of query.

According to the embodiment, the speech data retrieval apparatus can effectively retrieve the inverted index table when using the confusion network created to reduce the file size of inverted index table.

In order to achieve the above objects, there is provided a speech data retrieval apparatus comprising: a speech database including plural pieces of speech data therein; two or more speech recognition units each of which is configured to read speech data from the speech database, carry out a speech recognition process with respect to the read speech data, and output a result of speech recognition process as a lattice in which a phoneme, a syllable, or a word is a base unit, wherein a base unit of lattice output from one speech recognition unit differs from one output from another speech recognition unit; two or more confusion network creation units respectively connected to the two or more speech recognition unit, wherein each confusion network creation unit is configured to create a confusion network based on the lattice from the corresponding speech recognition unit and output the result of speech recognition process as the confusion network; two or more inverted index table creation units respectively connected to the two or more confusion network creation units, wherein each inverted index table creation unit is configured to create an inverted index table based on the confusion network from the corresponding confusion network creation unit; a query input unit configured to receive a query input by a user, carry out a speech recognition process with respect to the received query, and output a result of speech recognition process as a character string; two or more query conversion units each of which is configured to convert the character string from the query input unit into a label string in which a phoneme, a syllable, or a word is a base unit, wherein a base unit of label string converted in one query conversion unit differs from one converted in another query conversion unit; two or more label string check units respectively connected to the two or more inverted index table creation units and the two or more query conversion units, wherein each label string check unit is configured to check the label string from the corresponding query conversion unit against the inverted index table from the corresponding inverted index table creation unit, and retrieve speech data which is included in both of the label string and the speech database; and a retrieval result integration unit configured to read retrieval results from the two or more label string check units, integrate the read retrieval results to create a retrieval result list, and output a list of pointer which indicates an address in the speech database in which speech data included in the retrieval result list is stored.

According to the present invention, in comparison with the conventional speech data retrieval apparatus, the speech data retrieval apparatus can execute parallel speech data retrieval processing using plural label systems.

In order to achieve the above objects, there is provided a speech data retrieval apparatus comprising: a speech database including plural pieces of speech data therein; two or more speech recognition units each of which is configured to read speech data from the speech database, carry out a speech recognition process with respect to the read speech data, and output a result of speech recognition process as a lattice in which a phoneme, a syllable, or a word is a base unit, wherein a base unit of lattice output from one speech recognition unit differs from one output from another speech recognition unit; two or more confusion network creation units respectively connected to the two or more speech recognition unit, wherein each confusion network creation unit is configured to create a confusion network based on the lattice from the corresponding speech recognition unit and output the result of speech recognition process as the confusion network; a confusion network combination unit configured to combine confusion networks from the two or more confusion network creation units to create a combination network, and output the combination network; an inverted index table creation unit configured to create an inverted index table based on the combination network from the confusion network combination unit; a query input unit configured to receive a query input by a user, carry out a speech recognition process with respect to the received query, and output a result of speech recognition process as a character string; a query conversion unit configured to convert the character string from the query input unit into a label string in which two or more of a phoneme, a syllable, and a word are a base unit; a label string check unit configured to check the label string from the query conversion unit against the inverted index table from the inverted index table creation unit, retrieve speech data which is included in both of the label string and the speech database, and output a list of pointer which indicates an address in the speech database in which the retrieved speech data is stored.

According to the present invention, in comparison with the conventional speech data retrieval apparatus, the speech data retrieval apparatus can retrieve speech data even if both of a registered word and a non-registered word are included in a query.

In order to achieve the above objects, there is provided a speech data retrieval method comprising: reading speech data from a speech database which includes plural pieces of speech data therein; carrying out a speech recognition process with respect to the read speech data; outputting a result of speech recognition process as a lattice in which a phoneme, a syllable, or a word is a base unit; creating a confusion network based on the output lattice; outputting the result of speech recognition process as the confusion network; creating an inverted index table based on the output confusion network; receiving a query input by a user; carrying out a speech recognition process with respect to the received query; outputting a result of speech recognition process as a character string; converting the output character string into a label string in which a phoneme, a syllable, or a word is a base unit; checking the label string against the inverted index table; retrieving speech data which is included in both of the label string and the speech database; and outputting a list of pointer which indicates an address in the speech database in which the retrieved speech data is stored.

According to the present invention, in comparison with the conventional speech data retrieval method, the speech data retrieval method can reduce the file size of inverted index table. Further, in comparison with the conventional speech data retrieval method, the speech data retrieval method can retrieve speech data with high-accuracy without being constrained by a language mode used in speech recognition.

In order to achieve the above objects, there is provided a speech data retrieval program comprising: a first speech data retrieval program code for causing a computer to read speech data from a speech database which includes plural pieces of speech data therein; a second speech data retrieval program code for causing the computer to carry out a speech recognition process with respect to the read speech data; a third speech data retrieval program code for causing the computer to output a result of speech recognition process as a lattice in which a phoneme, a syllable, or a word is a base unit; a fourth speech data retrieval program code for causing the computer to create a confusion network based on the output lattice; a fifth speech data retrieval program code for causing the computer to output the result of speech recognition process as the confusion network; a sixth speech data retrieval program code for causing the computer to create an inverted index table based on the output confusion network; a seventh speech data retrieval program code for causing the computer to receive a query input by a user; an eighth speech data retrieval program code for causing the computer to carry out a speech recognition process with respect to the received query; a ninth speech data retrieval program code for causing the computer to output a result of speech recognition process as a character string; a tenth speech data retrieval program code for causing the computer to convert the output character string into a label string in which a phoneme, a syllable, or a word is a base unit; an eleventh speech data retrieval program code for causing the computer to check the label string against the inverted index table; a twelfth speech data retrieval program code for causing the computer to retrieve speech data which is included in both of the label string and the speech database; and a thirteenth speech data retrieval program code for causing the computer to output a list of pointer which indicates an address in the speech database in which the retrieved speech data is stored.

According to the present invention, in comparison with the conventional speech data retrieval program, the speech data retrieval program can cause the computer to reduce the file size of inverted index table. Further, in comparison with the conventional speech data retrieval program, the speech data retrieval program can cause the computer to retrieve speech data with high-accuracy without being constrained by a language mode used in speech recognition.

In order to achieve the above objects, there is provided a computer usable medium having a computer readable speech data retrieval program embodied therein, the computer readable speech data retrieval program comprising: a first speech data retrieval program code for causing a computer to read speech data from a speech database which includes plural pieces of speech data therein; a second speech data retrieval program code for causing the computer to carry out a speech recognition process with respect to the read speech data; a third speech data retrieval program code for causing the computer to output a result of speech recognition process as a lattice in which a phoneme, a syllable, or a word is a base unit; a fourth speech data retrieval program code for causing the computer to create a confusion network based on the output lattice; a fifth speech data retrieval program code for causing the computer to output the result of speech recognition process as the confusion network; a sixth speech data retrieval program code for causing the computer to create an inverted index table based on the output confusion network; a seventh speech data retrieval program code for causing the computer to receive a query input by a user; an eighth speech data retrieval program code for causing the computer to carry out a speech recognition process with respect to the received query; a ninth speech data retrieval program code for causing the computer to output a result of speech recognition process as a character string; a tenth speech data retrieval program code for causing the computer to convert the output character string into a label string in which a phoneme, a syllable, or a word is a base unit; an eleventh speech data retrieval program code for causing the computer to check the label string against the inverted index table; a twelfth speech data retrieval program code for causing the computer to retrieve speech data which is included in both of the label string and the speech database; and a thirteenth speech data retrieval program code for causing the computer to output a list of pointer which indicates an address in the speech database in which the retrieved speech data is stored.

According to the present invention, in comparison with the conventional speech data retrieval program, the speech data retrieval program can cause the computer to reduce the file size of inverted index table. Further, in comparison with the conventional speech data retrieval program, the speech data retrieval program can cause the computer to retrieve speech data with high-accuracy without being constrained by a language mode used in speech recognition.

BRIEF DESCRIPTION OF DRAWINGS

FIG. 4 is tabular data representing the relation of connections between nodes and arcs in the lattice shown in FIG. 3.

FIG. 5 is an inverted index table created based on the lattice shown in FIG. 3 according to a method of a non-patent document 1.

FIG. 9 is a block diagram of a speech data retrieval apparatus according to a first embodiment of the present invention.

FIG. 10 is a confusion network created based on the lattice shown in FIG. 3 according to the first embodiment of the present invention.

FIG. 11 is tabular data representing the relation of connections between nodes and arcs in the confusion network shown in FIG. 10.

FIG. 12 is an inverted index table created based on the confusion network shown in FIG. 10.

FIG. 13A is a partial confusion network, which is formed by labels forming a label string of query and special symbols, extracted from the confusion network shown in FIG. 10.

FIG. 13B is a graph of query.

FIG. 13C is a graph created as a result of intersection between the partial confusion network shown in FIG. 13A and the graph of query shown in FIG. 13B.

FIG. 14 is a flow chart for obtaining based on a label string of query a pair of an utterance ID number and an appearance probability for the label string according to the first embodiment of the present invention.

FIG. 15 is a flow chart showing a speech data retrieval method according to the first embodiment of the present invention.

FIG. 16 is tubular data representing a reduction effect of inverted index table and a retrieval performance of speech data according to the first embodiment of the present invention.

FIG. 20 is a flow chart showing a method for creating a combination network according to the third embodiment of the present invention.

FIG. 23 is a flow chart showing a speech data retrieval method according to the third embodiment of the present invention.

BEST MODE FOR CARRYING OUT THE INVENTION

Figures 1, 2, 3:
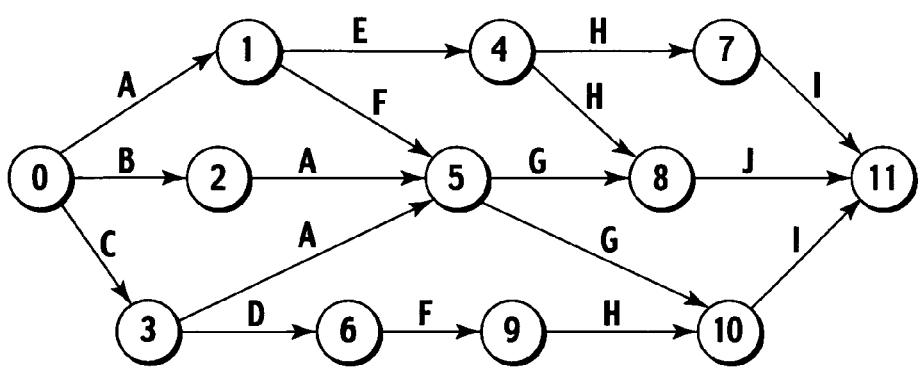
FIG. 1 is a conventional inverted index table consisting of plural data sets each of which includes a word and a list of document ID numbers.
FIG. 2 is a conventional inverted index table consisting of plural data sets each of which includes a word and a pair of a document ID number and an appearance position of the word.
FIG. 3 is a conventional lattice showing as a digraph one or more words, phonemes or syllables to be one or more candidates forming a sentence of spoken utterance.
Figure 6:
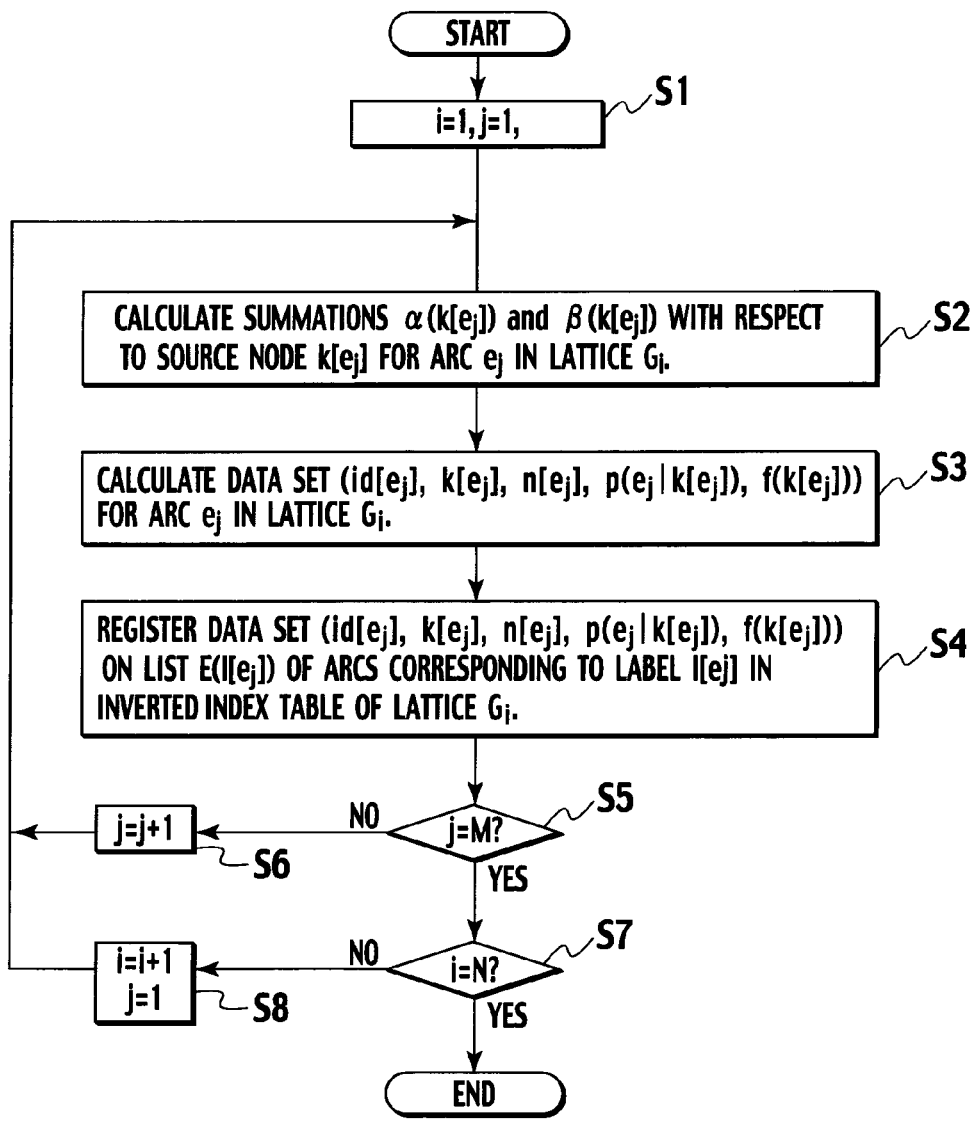
FIG. 6 is a flow chart showing a conventional method for creating an inverted index table based on N lattices.

With reference to FIGS. 9 to 23, we will describe first to third embodiments of the present invention below. The conventional speech data retrieval apparatus has created an inverted index table based on a lattice output from a speech recognition unit. In contrast, a speech data retrieval apparatus of the present invention converts a lattice output from a speech recognition unit into a confusion network, and then creates an inverted index table based on the confusion network. Thus, since the speech data retrieval apparatus of the present invention creates the inverted index table based on not the lattice but the confusion network, a label check method to be carried out in a label string check unit differs from a conventional label check method.

First Embodiment

With reference to FIGS. 9 to 16, we will describe the first embodiment of the present invention.

As shown in FIG. 9, a speech data retrieval apparatus 10 comprises a speech database 1, a speech recognition unit 2, a confusion network creation unit 3, an inverted index table creation unit 4, an inverted index table storing unit 5, a query input unit 6, a query conversion unit 7, a label string check unit 8 and a retrieval result output unit 9.

The speech database 1 includes plural pieces of speech data to be retrieved therein. Each piece of speech data is obtained from various files. For example, each piece of speech data is obtained from a speech track file in a television program, a movie or the like, a speech file on Internet, or a video file with sound on Internet. It is noted that each piece of speech data may be divided by a more fine utterance unit using means for automatically retrieving a silence section in a speech signal.

The speech recognition unit 2 reads, plural pieces of speech data from the speech database 1 and carries out a speech recognition process. Then, the speech recognition unit 2 outputs into the confusion network creation unit 3 one candidate for the result of speech recognition or plural candidates for the results of speech recognition in digraph type data structure such as a phoneme lattice, a syllable lattice or a word lattice. In the present embodiment, the speech recognition unit 2 outputs into the confusion network creation unit 3 plural candidates for the results of speech recognition in the digraph type data structure.

In the speech recognition process, an acoustic model, a pronunciation dictionary and a language model are generally used. The acoustic model includes a character of acoustic pattern by a basic unit of speech recognition (e.g. phoneme) therein. In a case where the basic unit of speech recognition is phoneme, the acoustic model includes therein an average acoustic pattern recognized by a time section (e.g. three time sections: a first half section, a middle section and a second half section) that is one of sub-units into which the basic unit is divided. The pronunciation dictionary includes therein a table showing the relations between words and phoneme strings corresponding to the words. Generally, the pronunciation dictionary contains only tens of thousands of words in order to reduce the number of process steps and the amount of memory to be used in a speech recognition process. The language model is represented as a digraph including therein a rule for connecting two or more words and a weight representing likelihood of a connection between words.

Next, we will describe a process for generating one candidate for the result of speech recognition and then outputting the one candidate into the confusion network creation unit 3.

The speech recognition unit 2 compares an acoustic pattern sequence of a spoken utterance with an acoustic pattern sequence of a phoneme string corresponding to each word string which is permitted in the language model, and calculates a degree of acoustic similarity with respect to two acoustic pattern sequences. Then, the speech recognition unit 2 calculates a score by adding to the calculated degree of acoustic similarity a weight representing likelihood of connection between words which is permitted in the language model. After repeating the above-described processes, the speech recognition unit 2 selects one score having the highest value from among plural calculated scores.

More specifically, the speech recognition process has the following process. The speech recognition unit 2 calculates an acoustic pattern (e.g. Mel-Frequency Cepstrum Coefficient: MFCC) by a time section (e.g. ten millisecond) from a start point of spoken utterance, and generates an acoustic pattern sequence. Then, the speech recognition unit 2 reads a first acoustic pattern from the acoustic pattern sequence and calculates a degree of acoustic similarity that the first acoustic pattern is similar to a first acoustic pattern of a first phoneme of each word which is permitted to be located at a first position of sentence in the language model (e.g. N-gram model). The speech recognition unit 2 registers the calculated degree of acoustic similarity as a hypothesis of time "1".

Next, the speech recognition unit 2 reads a second acoustic pattern from the acoustic pattern sequence, and generates two hypotheses as a hypothesis of time "2" following the hypothesis of time "1" in view of two possibilities that the acoustic pattern of time "1" continues and the acoustic pattern of time "1" changes according to the phoneme string of the each word. More specifically, the speech recognition unit 2 calculates (1) a degree of acoustic similarity that the second acoustic pattern is similar to a second acoustic pattern of the first phoneme of the each word which coincides with the acoustic pattern of time "1"; and (2) a degree of acoustic similarity that the second acoustic pattern is similar to a second acoustic pattern of the first phoneme of the each word which differs from the acoustic pattern of time "1". Then, the speech recognition unit 2 adds each calculated degree of acoustic similarity to the degree of acoustic similarity registered as the hypothesis of time "1" and generates two new degrees of acoustic similarities. The speech recognition unit 2 registers the two new degrees of acoustic similarities as the hypothesis of time "2".

Thus, the speech recognition unit 2 increments a value of time by one, reads an acoustic pattern from the acoustic pattern sequence in order, adds each degree of acoustic similarity calculated in a current time to each degree of acoustic similarity registered as a hypothesis of previous time, and registers the calculated degrees of acoustic similarities as a hypothesis of current time following the hypothesis of previous time. It is noted that, in a case where an acoustic pattern of previous time is a final acoustic pattern of word, the speech recognition unit 2 generates M+1 (M: the number of next word which is permitted to be located at a position next to the word in the language model) hypotheses as a hypothesis of current time, in view of two possibilities that the acoustic pattern of previous time continues and the acoustic pattern of previous time changes to a first acoustic pattern of a first phoneme of the next word which is permitted to be located at a position next to the word. If a word changes, the speech recognition unit 2 calculates a score by adding to a degree of acoustic similarity registered as a hypothesis of previous time a weight representing likelihood of connection between words which is permitted in the language model.

After reading a final acoustic pattern from the acoustic pattern sequence and generating plural hypotheses of current time, the speech recognition unit 2 selects from among the plural hypotheses a hypothesis having the highest score corresponding to the final acoustic pattern of a final phoneme of word which is permitted to be located at a final position of sentence in the language model. Then, the speech recognition unit 2 outputs a word string (or a phoneme string) corresponding to the selected hypothesis into the confusion network creation unit 3 as one candidate for the result of speech recognition.

In the speech recognition process, if two or more acoustic patterns of each time appear at the same position from a start point of an acoustic pattern sequence of the same word string (or the same phoneme string), the speech recognition unit 2 may remain a hypothesis having the highest score among two or more hypotheses of the each time and delete other hypotheses (hypothesis). In this case, the speech recognition unit 2 may delete one or more hypotheses each having a score below a certain threshold among two or more hypotheses of the each time.

Next, we will describe a process for generating plural candidates for the results of speech recognition and then outputting the plural candidates into the confusion network creation unit 3.

As described previously, after reading a final acoustic pattern from an acoustic pattern sequence and generating plural hypotheses of current time, the speech recognition unit 2 outputs word strings (or phoneme strings) corresponding to the generated plural hypotheses in digraph type data structure into the confusion network creation unit 3 as plural candidates for the results of speech recognition. This data structure has a word name (or phoneme name), a starting time, an ending time and score information as an arc of graph. Each arc has a word name (or phoneme name), a starting time, an ending time and score information, with respect to a word (or phoneme) selected from among one or more words (or phonemes) to be located next to a word (or phoneme) to be associated, and connects a source node to a destination node. This operation creates the digraph representing the plural candidates for the results of speech recognition. The digraph is called a lattice. If each arc represents one word, the digraph is called a word lattice. If each arc represents one phoneme, the digraph is called a phoneme lattice.

The lattice includes only word strings having words between which the connection is permitted in the language model employed in the speech recognition process. Further, if the starting times or the ending times of plural words differ from each other while the plural words are the same words, the lattice includes redundant arcs because the plural words are registers as arcs which differ from each other.

The confusion network creation unit 3 converts into a confusion network the digraph type data structure such as a phoneme lattice, a syllable lattice or a word lattice output from the speech recognition unit 2. FIG. 10 shows a confusion network obtained from the lattice shown in FIG. 3. Arcs "A", "B", "C", "D", "E", "F", "G", "H", "I" and "J" shown in FIG. 10 represent labels such as phonemes, syllables or words. A symbol "@" stands for a special label which indicates that there is not any corresponding label and skips between a source node and a destination node thereof. FIG. 11 shows tubular data of the confusion network shown in FIG. 10.

The confusion network represents plural hypotheses in digraph type data structure, as well as the lattice. One label string from a leftmost starting node to a rightmost ending node of the confusion network represents one candidate for the result of speech recognition. The confusion network creation unit 3 converts the lattice shown in FIG. 3 into the confusion network shown in FIG. 10 by contracting the same labels which belong to adjacent time zones in a lattice to create one label and then collecting the different labels which belong to adjacent time zones in the lattice to create one opposed candidate group. Pairs of labels {@, B, C}, {A, D}, {@, E, F}, {G, H} and {I, J} indicate opposed candidate groups. These opposed candidate groups are connected in this order to form a confusion network. The symbol "@" stands for the special label which indicates that there is not any corresponding label. For example, although there is a path passing through the label "A" from the node "0" in the lattice shown in FIG. 3, there is a path passing through the label "A" from the node "0" while skipping the labels "B" and "C" by using the special label "@" in the confusion network shown in FIG. 10. Thus, the confusion network can include more candidates for the results of speech recognition because it has a compact data structure and a lot of paths (e.g. a path passing through the label "D" from the node "0" is added in comparison with the lattice shown in FIG. 3).

An algorithm for converting a lattice into a confusion network is definitely described in a non-patent document 2 (L. Mangu, E. Brill and A. Stolcke, "Finding consensus in speech recognition: word error minimization and other applications of confusion networks", *Computer Speech and Language*, 14, pp. 373-400, 2000). The confusion network creation unit 3 first converts a weight of arc into a posterior probability of arc with respect to each arc on a lattice, in order to convert the lattice into a confusion network. For example, a value of the posterior probability P(e|G) of arc e in a lattice G is given by dividing the summation of weights of paths from a starting node to an ending node through the arc e in the lattice G by the summation of weights of all paths from the starting node to the ending node. Namely, the value of posterior probability P(e|G) is calculated according to as follows:

$$P(e|G)=\alpha(k[e])*w[e]*\beta(n[e])/\beta(\text{starting node})$$

The confusion network creation unit 3 then contracts two or more arcs each in which a degree of similarity between arcs has a certain value or more, or two arcs each in which a degree of similarity between arcs has the highest value, to create one arc. It is noted that the degree of similarity between arcs is a measure based on a degree of overlap between time sections, a degree of similarity between pronunciations and the like. When the two or more arcs (or the two arcs) are contracted, the confusion network creation unit 3 assumes a value given by adding posterior probabilities of the two or more arcs (or the two arcs) as a posterior probability of created one arc.

The confusion network creation unit 3 next creates plural opposed candidate groups which respectively include remaining arcs therein, and contracts two or more opposed candidate groups each in which a degree of similarity between opposed candidate groups has a certain value or more, or two opposed candidate groups each in which a degree of similarity between opposed candidate groups has the highest value, to create one opposed candidate group (clustering between labels). It is noted that the degree of similarity between opposed candidate groups is a measure based on a degree of overlap between a time section of arc included in one group and a time section of arc included in another group, a degree of similarity between a pronunciation of arc included in one group and a pronunciation of arc included in another group and the like. When the confusion network creation unit 3 contracts two or more opposed candidate groups (or two opposed candidate groups) to create one opposed candidate group, if there are one or more paths each of which passes through remaining arcs in all paths from a starting node to an ending node of a lattice, the confusion network creation unit 3 does not contract two or more opposed candidate groups (or two opposed candidate groups) in which the remaining arcs are included in order not to break an order relation of arcs on the lattice.

The confusion network creation unit 3 arranges remaining opposed candidate groups in a line according to a temporal order of arcs on an original lattice, puts one node between each adjacent two opposed candidate groups, and connects each arc in each opposed candidate group to adjacent two nodes. This process creates a confusion network shown in FIG. 10. In a case where the summation of posterior probabilities of arcs included in an opposed candidate group is less than "1", this means that there is a path which does not pass through any arcs included in the opposed candidate group in all paths from a starting node to an ending node of an original lattice. In order to represent a label string corresponding to this path, the confusion network creation unit 3 adds into the opposed candidate group an arc having the special label "@" which indicates that a path can skip the opposed candidate group (see FIG. 11). A value of posterior probability of added arc is calculated according to as follows:

1−(summation of posterior probabilities of arcs included in opposed candidate group)

The inverted index table creation unit 4 sorts each piece of arc information of each confusion network from the confusion network creation unit 3 by label assigned to each arc to create an inverted index table. The procedure for creating an inverted index table based on a confusion network is the same as that for creating an inverted index table based on a lattice.

In a confusion network, the appearance probability f(k[e]) of node is always "1" because any path from a starting node to an ending node passes through all nodes. Therefore, it is not necessary to register the value of appearance probability f(k[e]) of node on an inverted index table. Further, the following relation is established between the numbers of source node and destination node by assigning a node number to a node from a starting node in order:

$$k[e](\text{number of source node})=n[e](\text{number of destination node})-1$$

In view of this relation, the inverted index table creation unit 4 registers on an inverted index table not both of the numbers of source node k[e] and destination node n[e] but only the number of source node k[e]. Therefore, the conversion of a lattice into a confusion network can reduce the number of arcs to be registered in an inverted index table and the size of arc information.

FIG. 12 shows an inverted index table created based on the confusion network shown in FIG. 10. Each arc registered on the inverted index table has a data set (utterance ID number id[e], the number of destination node k[e], posterior probability P(e|G)). The inverted index table creation unit 4 writes a created inverted index table into a file, and outputs the file into the inverted index table storing unit 5. The inverted index table creation unit 4 may directly output the created inverted index table into the label string check unit 8.

The query input unit 6 receives an input of query from a user. The input of query is an input of character string by a key board or a voice input by a user. In a case of the voice input, the query input unit 6 carries out a speech recognition process to convert the voice input into a character string.

The query conversion unit 7 converts the character string input as the query into a label string based on a phoneme unit, a syllable unit or a word unit. In a case of converting the character string into a label string based on a word unit, the query conversion unit 7 selects a word string which has the maximum summation of connection likelihood between adjacent words at a time of dividing the character string by a word unit, by means of information regarding word names and adjacency between words (connection likelihood), and then regards the selected word string as a label string. In a case of converting the character string into a label string based on a phoneme unit or a syllable unit, the query conversion unit 7 replaces a word included in the character string with a phonetic representation to create a phoneme string or a syllable string, by means of a dictionary which stores information regarding a word and a phonetic representation (phoneme string or syllable string) for the word therein, and then regards the created phoneme string or syllable string as a label string. This dictionary differs from the pronunciation dictionary employed in the speech recognition unit 2 and is an exhaustive dictionary such as a dictionary of English language which generally includes hundreds of thousands of words therein.

The label string check unit 8 checks a label string read from the query conversion unit 7 against an inverted conversion table output from the inverted index table creation unit 4 or read from a file stored in the inverted index table storing unit 5, to obtain a set of speech data (spoken utterance) included in the label string.

In a confusion network, the check of adjacency between two labels is complicated in comparison with that of the conversional method. In a case of lattice, a label string check unit only checks whether or not the equation "n[e]=k[r]" is established, with respect to one arc "e" which has one label and another arc "r" which has another label, in order to check the adjacency between two labels. On the other hand, in a case of confusion network, since the confusion network includes the special label "@" therein, the label string check unit 8 needs to check whether or not the equation "n[e]=k[r]" is established, whether or not there is an arc which has the special label "@" between the arcs "e" and "r", and whether or not there is a path which passes through an arch that has only the special label "@" between the arcs "e" and "r", in order to check the adjacency between two labels.

In this embodiment, the label string check unit 8 represents a label string of query by one-dimensional array graph, and assigns to each node in the graph of query an arc which has the special label "@" indicating that the arc returns to a source node. Then, the label string check unit 8 calculates an intersection between the graph of query and the confusion network. If a graph which is created as a result of the intersection is an empty graph or a graph in which there is not a path from a starting node to an ending node, the label string of query is not included in the confusion network. Here, when calculating the intersection, the label string check unit 8 creates a partial confusion network by using only arcs appearing in the label string of query and calculates the intersection between the graph of query and the partial confusion network. Since the size of partial confusion network is smaller than that of confusion network, the amount of calculation is reduced.

For example, we assume that the label string check unit 8 checks whether or not a label string "AH" of query appears in the confusion network shown in FIG. 10 and calculates an appearance probability of label string "AH". Firstly, the label string check unit 8 creates a partial confusion network formed by only arcs corresponding to labels "A" and "H" and the special label "@" based on the confusion network shown in FIG. 10 (see FIG. 13A). Secondly, regarding the label string "AH" of query, the label string check unit 8 connects an arc having a label "A" to an arch having a label "H" via a node "1" and assigns a starting node "0" and an ending node "2" to a source node of the label "A" and a destination node of the label "H", respectively. Then, the label string check unit 8 assigns to each node an arc having the special label "@" to create a graph of query (see FIG. 13B). Finally, the label string check unit 8 calculates the intersection between the graph of query and the partial confusion network and obtains a graph which is created as a result of the intersection (see FIG. 13C). In the graph created as the result of the intersection, two numbers (i, j) assigned to each node correspond to a node number in the partial confusion network and a node number in the graph of query, respectively. If the graph created as the result of the intersection is not an empty graph and has at least one path from a starting node to an ending node, the label string of query is included in the confusion network.

Here, we will describe an algorithm for calculating an intersection between two graphs G1 and G2 and returning a result of calculation to one graph G. The algorithm is as follows,

| Intersection (G1, G2) |
| --- |
| 1    V←I1*I2 |
| 2    S←I1*I2 |
| 3    while S≠Φ do |
| 4        (v1, v2)←HEAD(S) |
| 5        DEQUEUE(S) |
| 6        if (v1, v2)∈I1*I2 then |
| 7           I←IU{(v1, v2)} |

| Intersection (G1, G2) |
| --- |
| 8        if (v1, v2) ∈ F1*F2 then |
| 9           F←FU{(v1, v2)} |
| 10       for each (e1, e2)∈E[v1]*E[v2] such that l[e1]=l[e2] do |
| 11           if not (n[e1], n[e2])∈V then |
| 12              V←VU{(n[e1], n[e2])} |
| 13              ENQUEUE(S, (n[e1], n[e2])) |
| 14           E←EU{((v1, v2), (n[e1], n[e2]), l[e1], w[e1]*w[e2])} |
| 15    return G | where the graph G has a set V of nodes, a set H of arcs, a set I of starting node and a set F of ending node, a set H(v) of arcs is a set of arcs coming in a node v, k[e] is a source node of arc e, n[e] is a destination node of arc e, l[e] is a label of arc e, w[e] is weight of arc e, HEAD(S) is a function for returning a head element of queue S, DEQUEUE(S) is a function for deleting a head element of queue S, and ENQUEUE (S, x) is a function for inserting an element x into an end position of queue S. In order to distinguish nodes and arcs corresponding to two graphs G1 and G2, suffixes "1" and "2" are assigned to each alphabet.

In the graph created as the result of intersection, the label string check unit 8 calculates the summation of appearance probabilities of all paths from a starting node to an ending node according to the Forward algorithm and regards the calculated value as an appearance probability of label string of query. If the appearance probability of label string of query is more than 0, the label string check unit 8 reads an utterance ID number from an inverted index table of confusion network including this label string and then registers a pair of the utterance ID number and the appearance probability for this label string on a retrieval result list.

Next, with reference to FIG. 14, we will describe procedure for obtaining based on a label string of query a pair of an utterance ID number and an appearance probability for the label string.

Figure 7:
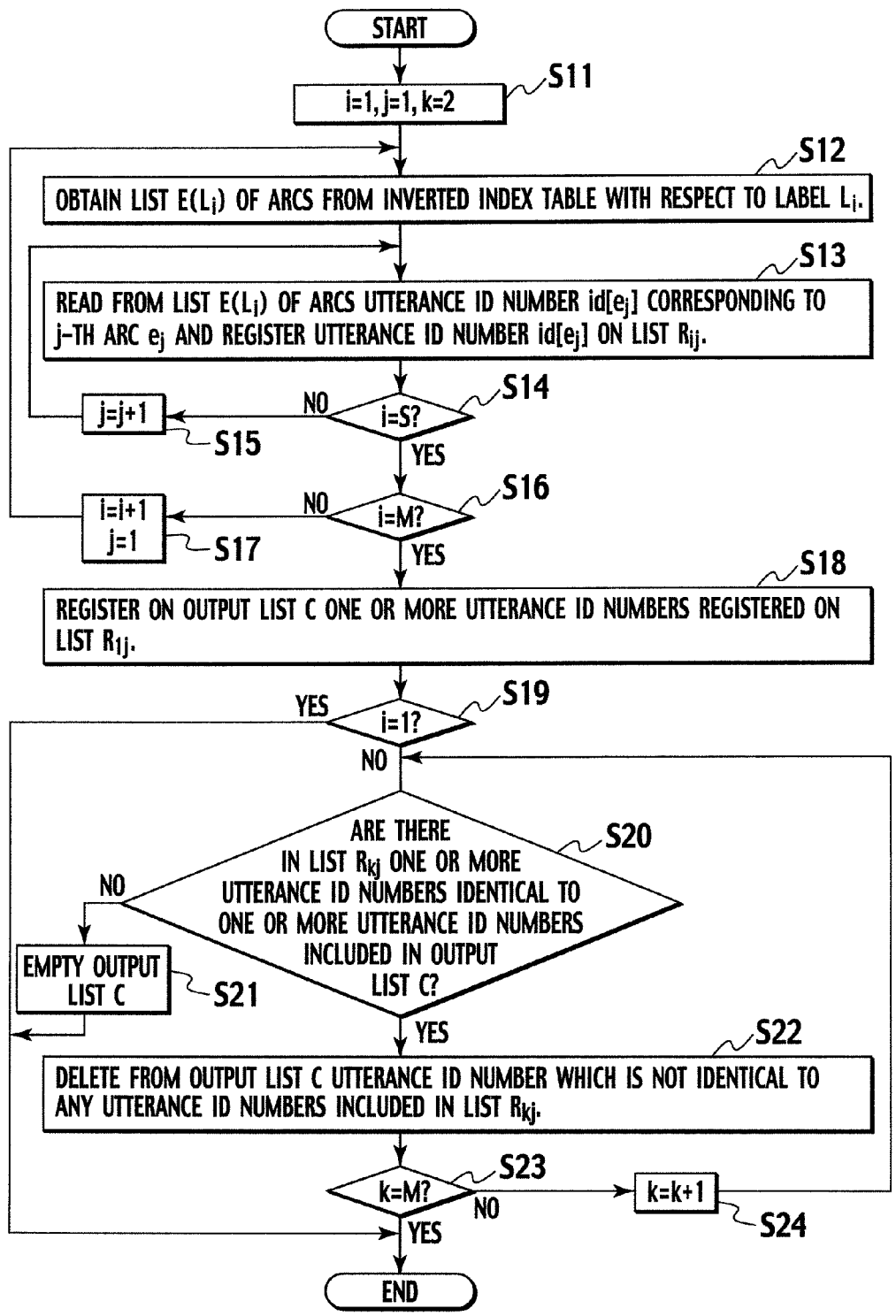
FIG. 7 is a flow chart showing a conventional method for retrieving one or more lattices in which all labels forming a label string of query and retrieving a list of one or more utterance ID number assigned to the retrieved one or more lattices.
Figure 8:
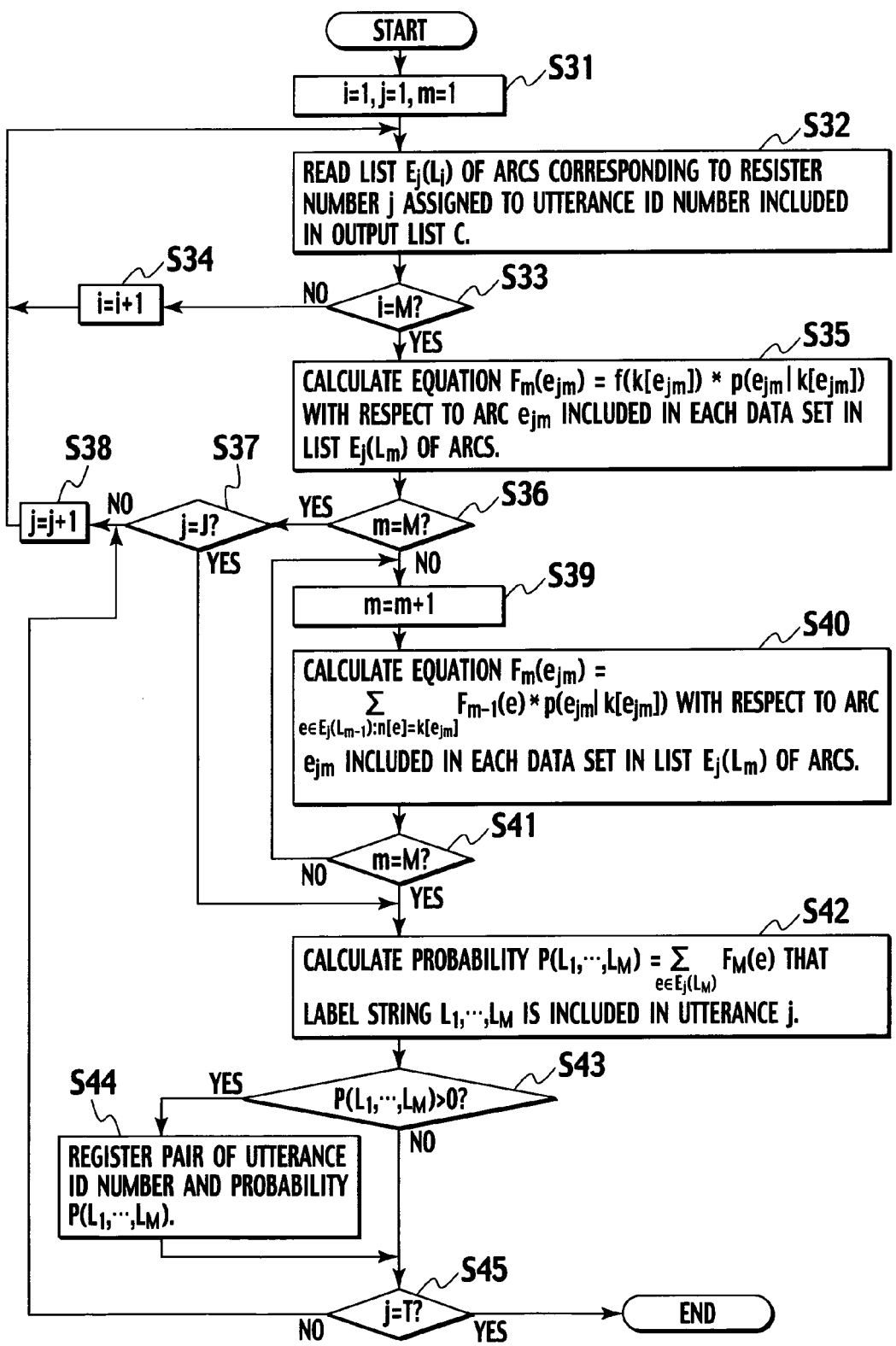
FIG. 8 is a flow chart showing a conventional method for determining whether or not an order of appearances of labels, which are retrieved according to procedure of FIG. 7, matches one of labels of the query, by each of lattices in which all labels forming the label string of the query are included.

In the state of generating the output list C according to the flowchart shown in FIG. 7, in step S51, the label string check unit 8 assigns "1" and "1" to arguments i and j. In step S52, the label string check unit 8 extracts from the output list C one or more utterance ID numbers included in lists $E(L_1) \ldots E(L_M)$ of arcs corresponding to a label string $L_1 \ldots L_M$ of query in common and numbers the one or more utterance ID numbers (that is, assigns registration numbers to the one or more utterance ID numbers sequentially). In step S53, the label string check unit 8 reads from the inverted index table a list $E_j(L_i)$ of arcs corresponding to a registration number j. In step S54, the label string check unit 8 determines whether or not the value of argument i is equal to the total number M of labels of query. If the value of argument i is not equal to the total number M, the label string check unit 8 carries out a process of step S55. If the value of argument i is equal to the total number M, the label string check unit 8 carries out a process of step S56. In step S55, the label string check unit 8 increments the value of argument j by one, and then returns to the process of step S53. In step S56, the label string check unit 8 reads from the inverted index table a list $E_j(@)$ of arcs corresponding to the registration number j. In step S57, the label string check unit 8 creates a partial confusion network D by using all arcs included in a set $\{E_j(L_1) \ldots E_j(L_M), E_j(@)\}$ of read lists of arcs. In the calculation of intersection, the label string check unit 8 regards each node included in the partial confusion network D as a starting node and an ending node. Alternatively, the label string check unit 8 may regard as the starting node only a source node of arc which has a label identical to the first label $L_1$ of query and as the ending node only a destination node of arc which has a label identical to the final label $L_M$ of query.

In step S58, the label string check unit 8 creates a graph Q of query based on the label string $L_1 \ldots L_M$ of query. More specifically, the label string check unit 8 prepares arcs each of which has a label $L_i$ ($1 \leq i \leq M$) in the label string $L_1 \ldots L_M$ of query, and arranges the arcs so as to have the same sequence as the label string $L_1 \ldots L_M$ of query. Then, the label string check unit 8 connects adjacent arcs via node to create the graph Q of query. If the list $E_j(@)$ of arcs is not empty, the label string check unit 8 prepares arcs each of which returns to a source node thereof with respect to nodes of the graph Q of query, and assigns labels "@" to the arcs. In the graph Q of query, a source node of arc which has the first label $L_1$ of query becomes a starting node and a destination node of arc which has the final label $L_M$ of query becomes an ending node.

In step S59, the label string check unit 8 calculates an intersection between the partial confusion network D and the graph Q of query and returns the result of calculation to a graph X, and calculates a composition of the partial confusion network D and the graph Q of query and returns the result of calculation to the graph X. More specifically, in the intersection, the label string check unit 8 sequentially compares a label in the partial confusion network D with one in the graph Q of query starting from a starting node in the partial confusion network D and one in the graph Q of query to retrieve an arc in which a label in the partial confusion network D is identical to one in the graph Q of query. When retrieving the arc, the label string check unit 8 proceeds to a destination node of the arc in the partial confusion network D (or graph Q of query) and then compares a label in the partial confusion network D with one in the graph Q of query, with respect to each arc going out of the destination node, to retrieve a next arc in which a label in the partial confusion network D is identical to one in the graph Q of query. The label string check unit 8 repeats the above-described process to obtain one or more pairs of retrieved arcs and source and destination nodes of the retrieved arcs. Then, the label string check unit 8 connects the one or more pairs to create a new graph X. In the new graph X, if there is a path which passes from a source node to a destination node through the retrieved arcs and source and destination nodes of the retrieved arcs, the label string check unit 8 decides that the label string of query included in the graph Q of query is included in the partial confusion network D.

In step S60, the label string check unit 8 checks whether or not there is an ending node in the graph X. If there is not an ending node in the graph X, the label string check unit 8 carries out a process of step S64. If there is an ending node in the graph X, the label string check unit 8 carries out a process of step S61. In step S61, the label string check unit 8 calculates a value $P(L_1 \ldots L_M)$ of summation of weights regarding the path included in the graph X according to the Forward algorithm. In step S62, the label string check unit 8 determines whether or not the value $P(L_1 \ldots L_M)$ of summation of weights is more than "0". If the value $P(L_1 \ldots L_M)$ of summation of weights is not more than "0", the label string check unit 8 carries out the process of step S64. If the value $P(L_1 \ldots L_M)$ of summation of weights is more than "0", the label string check unit 8 carries out a process of step S63. In step S63, the label string check unit 8 registers a pair of the utterance ID number and the value $P(L_1 \ldots L_M)$ of summation of weights for the utterance ID number on a retrieval result list S. In step S64, the label string check unit 8 determines whether or not the value of argument j is equal to a maximum value T of registration number. If the value of argument j is not equal to the maximum value T of registration number, the label string check unit 8 carries out a process of step S65. If the value of argument j is equal to the maximum value T of registration number, the label string check unit 8 carries out a process of step S66. In step S65, the label string check unit 8 increments the value of argument j by one and assigns "1" to the argument I, and then returns to the process of step S53. In step S66, the label string check unit 8 obtains based on the retrieval result list S one or more pointers that indicate one or more addresses in the speech database 1 in which one or more pieces of speech data corresponding to the label string of query are stored, outputs the obtained list of pointers to the retrieval result output unit 9, and finishes the series of processes.

The retrieval result output unit 9 reads the list of pointers obtained in the label string check unit 8. Then, the retrieval result output unit 9 extracts speech data information corresponding to the label string of query from the speech database 1 based on the read list of pointers, and outputs the extracted speech data information to a display. The retrieval result output unit 9 may display on the display a list of pairs each of which is composed of a file name of speech data and time section information of the speech data. Also, the retrieval result output unit 9 may reproduce speech data corresponding to the label string of query when a user clicks with a mouse an item of list displayed on the display.

Next, with reference to FIG. 15, we will describe a speech data retrieval method of this embodiment while giving one example of speech data. In this description, we assume that the arcs (labels) "A", "B", "C", "D", "E", "F", "G", "H", "I" and "J" shown in FIGS. 3 to 5 and 10 to 13C respectively represent words "Kyoto", "to", "at", "Tokyo", "the", "this", "Asian", "ancient", "capital" and "capacity".

In step S71, the speech recognition unit 2 reads speech data from the speech database 1 and then outputs to the confusion network creation unit 3 plural candidates for the results of speech recognition in digraph type data structure (word lattice) shown in FIG. 3. In step S72, the confusion network creation unit 3 converts the word lattice into the confusion network shown in FIG. 10 and then outputs the confusion network to the inverted index table creation unit 4. In step S73, the inverted index table creation unit 4 creates the inverted index table shown in FIG. 12 based on the confusion network and then outputs the inverted index table to the inverted index table storing unit 5. In step S74, the query input unit 6 receives an input (Kyoto ancient) of query from a user. In step S75, the query conversion unit 7 converts a character string "Kyoto ancient" input as a query into a label string "Kyoto" and "ancient" based on a word unit. It is noted that the processes of steps S74 and S75 may be carried out before the process of step S71 or be carried out at the same time as those of steps S71 to S73.

In step S76, the label string check unit 8 reads the label string "Kyoto" and "ancient" from the query conversion unit 7 and the inverted index table stored in the inverted index table storing unit 5. In step S77, the label string check unit 8 creates the partial confusion network shown in FIG. 13A formed by only arcs corresponding to labels "Kyoto" and "ancient" and the special label "@", with reference to the label string "Kyoto" and "ancient" of query and the inverted index table. In step S78, the label string check unit 8 creates the graph of query shown in FIG. 13B from the label string "Kyoto" and "ancient" of query. In step S79, the label string check unit 8 calculates an intersection between the graph of query and the partial confusion network to create the graph shown in FIG.

13C. In step S80, the label string check unit 8 calculates a value of summation of appearance probabilities with respect to all paths from a starting node to an ending node in the graph shown in FIG. 13C and regards the calculated value as an appearance probability of label string of query. In step S81, the label string check unit 8 reads an utterance ID number from the inverted index table of the confusion network in which the label string "Kyoto" and "ancient" is included and registers a pair of the utterance ID number of label string and the appearance probability on a retrieval result list. In step S82, the label string check unit 8 obtains based on the retrieval result list one or more pointers that indicate one or more addresses in the speech database 1 in which one or more pieces of speech data corresponding to the label string of query are stored, and outputs the obtained list of pointers to the retrieval result output unit 9. In step S83, the retrieval result output unit 9 reads a list of pointers obtained in the label string check unit 8 and extracts speech data information corresponding to the label string of query from the speech database 1. In step S84, the retrieval result output unit 9 outputs the extracted speech data information on the display.

Next, we will describe a reduction effect of inverted index table and a retrieval performance of speech data in this embodiment.

The speech database 1 includes about six hours of lecture speech data of a computer science class in Massachusetts Institute of Technology therein. The speech recognition process uses a serial word recognition system for outputting a word lattice in which a word is regarded as a label and a serial phoneme recognition system for outputting a phoneme lattice in which a phoneme is regarded as a label. The speech recognition unit 2 can switch between the serial word recognition system and the serial phoneme recognition system at any time. Also, the speech recognition unit 2 divides the lecture speech data into utterances, each of which has been spoken during about three or four seconds, by using signal power information or the like, and creates a lattice by utterance. The confusion network creation unit 3 converts each created lattice into a confusion network and then outputs the confusion network into the inverted index table creation unit 4. The inverted index table creation unit 4 creates an inverted index table based on the confusion network and then outputs the inverted index table into the inverted index table storing unit 5. Thereafter, the speech data retrieval apparatus 10 waits an input of query.

The query input unit 6 receives a query from a keyboard or a data file on which a keyword is registered. In a case where a phoneme is regarded as a label, the query conversion unit 7 converts each word of query into a phoneme string by using a dictionary prepared in advance. The label string check unit 8 checks the label sting of query against the inverted index table and then outputs a list of utterance ID numbers including the label string of query on the display.

FIG. 16 shows a reduction effect of inverted index table and a retrieval performance of speech data in this embodiment. 115 queries randomly set are used in this text. 115 queries includes therein 15 queries that are non-registered words which are not registered on the pronunciation dictionary and the language model used in the speech recognition unit 2. A length of query is 2.3 words length on average. In order to compare the speech data retrieval method of the present invention with the conventional speech data retrieval method, we structure one system for analyzing a label sting of query based on a word lattice and another system for analyzing a label string of query based on a phoneme lattice.

A measure "F-score" is used to evaluate a retrieval performance of speech data. F-score is a value of harmonic mean between the ratio (relevance ratio) of right speech data and retrieved speech data and the ratio (recall ratio) of found speech data and existing speech data. F-score has a value within a range of 0% to 100%. As F-score increases, the retrieval performance improves.

As shown in FIG. 16, a speech data retrieval method using one candidate (word string) for the result of speech recognition has the lowest F-score while reducing the file size of inverted index table, in comparison with other speech data retrieval methods using plural candidates (word strings or phoneme strings) for the results of speech recognition. A speech data retrieval method using a word confusion network has a relatively high F-score while reducing the file size of inverted index table, in comparison with a conventional speech data retrieval method using a word lattice. A speech data retrieval method using a phoneme confusion network has a relatively high F-score while reducing the file size of inverted index table, in comparison with a conventional speech data retrieval method using a phoneme lattice. Especially, the speech data retrieval method using a phoneme confusion network has the highest F-score in comparison with other speech data retrieval methods, and has a relatively high F-score for a non-registered word query (out-of-vocabulary word (OOV) query) which includes non-registered words that are not registered on the pronunciation dictionary and the language model in the speech recognition unit 2, in comparison with the conventional speech data retrieval method using a phoneme lattice.

The advantageous features of the speech data retrieval apparatus 10 will be described below.

The speech data retrieval method that the speech data retrieval apparatus 10 carries out can reduce the file size of inverted index table, in comparison with the conventional speech data retrieval method using a lattice.

The speech data retrieval method that the speech data retrieval apparatus 10 carries out can retrieve speech data with high-accuracy without being constrained by a language model used in speech recognition, in comparison with the conventional speech data retrieval method using a phoneme lattice.

The speech data retrieval method that the speech data retrieval apparatus 10 carries out can effectively retrieve an inverted index table when using a confusion network because the speech data retrieval apparatus 10 creates based on the confusion network a partial confusion network formed by only arcs having labels that appear in a label string of query.

Second Embodiment

Figure 17:
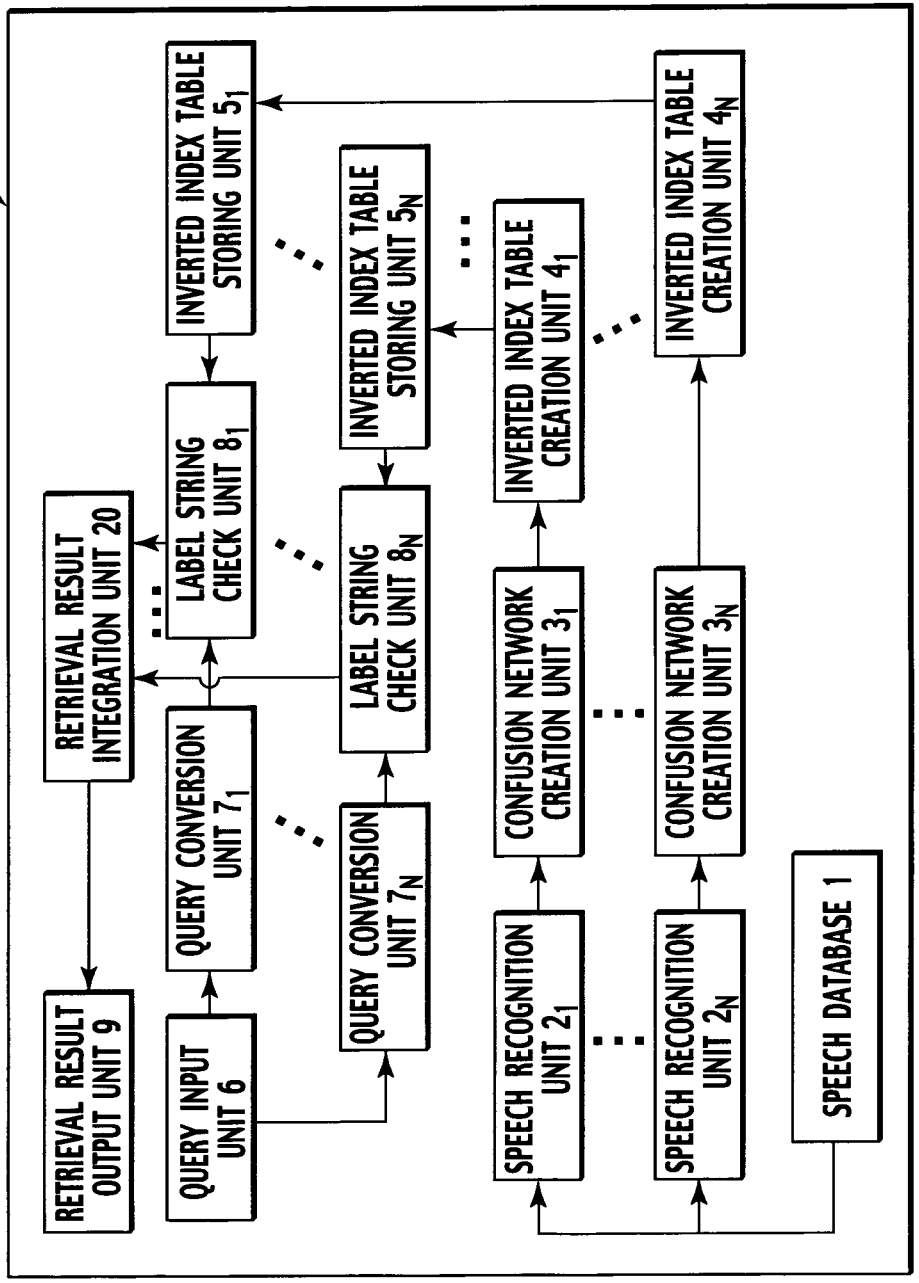
FIG. 17 is a block diagram of a speech data retrieval apparatus according to a second embodiment of the present invention.
Figure 18:
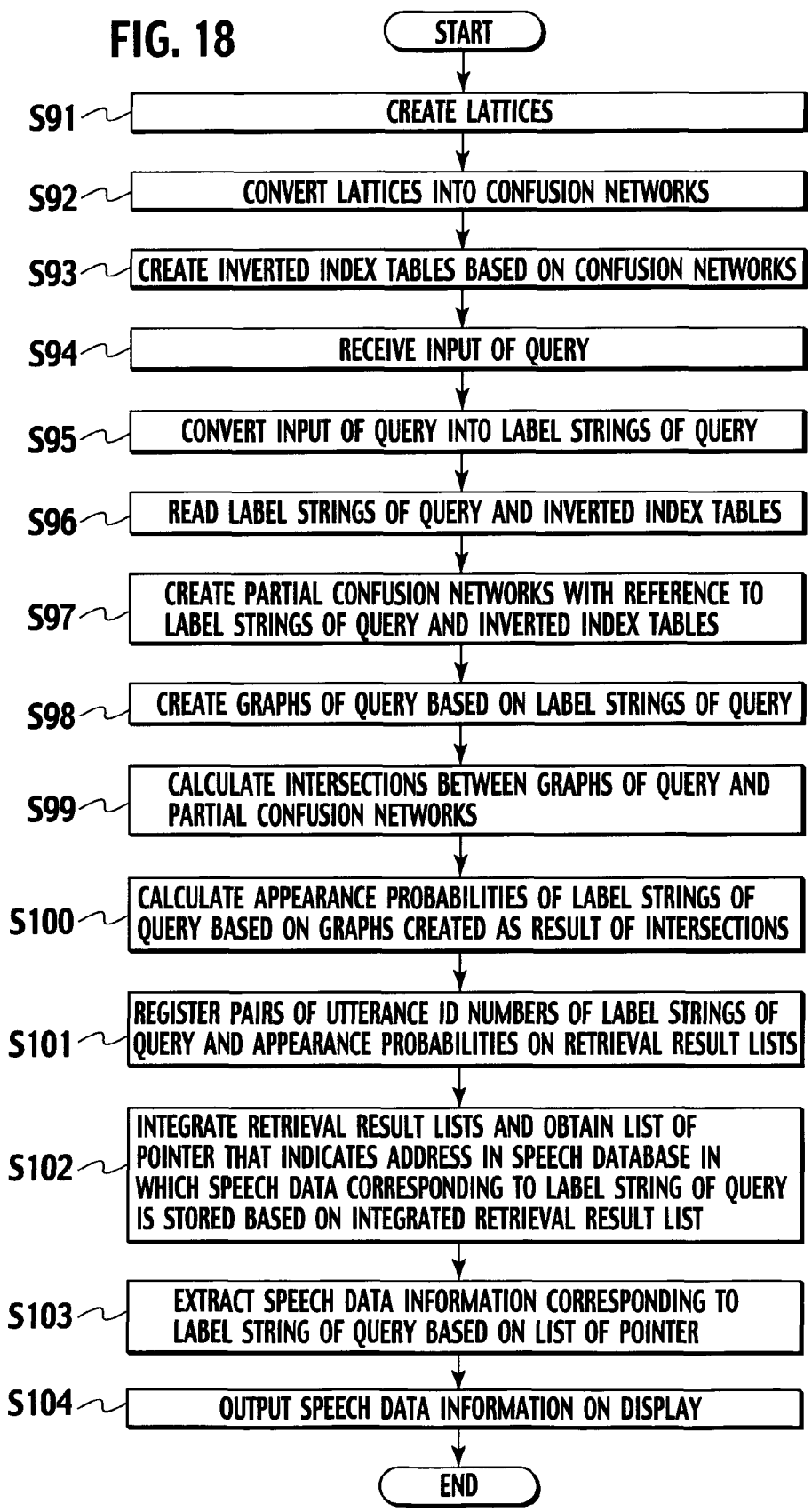
FIG. 18 is a flow chart showing the speech data retrieval method according to the second embodiment of the present invention.

With reference to FIGS. 17 and 18, we will describe a second embodiment of the present invention. The speech data retrieval apparatus 10 of the first embodiment retrieves speech data by using one kind of digraph (a phoneme lattice, a syllable lattice or a word lattice). In contrast, a speech data retrieval apparatus 30 of the second embodiment retrieves speech data by using N (N≧2) kinds of digraphs.

As shown in FIG. 17, the speech data retrieval apparatus 30 comprises the database 1, speech recognition units $2_1 \ldots 2_N$, confusion network creation units $3_1 \ldots 3_N$, inverted index table creation units $4_1 \ldots 4_N$, inverted index table storing units $5_1 \ldots 5_N$, the query input unit 6, query conversion units $7_1 \ldots 7_N$, label string check units $8_1 \ldots 8_N$, the retrieval result output unit 9 and a retrieval result integration unit 20.

The speech recognition unit $2_i$ ($1 \leq i \leq N$) is connected to the speech database 1. The confusion network creation unit $3_i$ ($1 \leq i \leq N$) is connected to The speech recognition unit $2_i$ and the inverted index table creation unit $4_i$ ($1 \leq i \leq N$). The inverted index table storing unit $5_i$ ($1 \leq i \leq N$) is connected to the inverted index table creation unit $4_i$ and the label string check unit $8_i$ ($1 \leq i \leq N$). The label string check unit $8_i$ is connected to the query conversion unit $7_i$ ($1 \leq i \leq N$) and the retrieval result integration unit 20.

Each of the speech recognition units $2_1 \ldots 2_N$ has the same configuration as the speech recognition unit 2 of the first embodiment. N digraphs used in the speech recognition units $2_1 \ldots 2_N$ differs one another. The speech recognition units $2_1 \ldots 2_N$ read speech data from the speech database 1 and carry out speech recognition processes. Each of the confusion network units $3_1 \ldots 3_N$ has the same configuration as the confusion network unit 3 of the first embodiment. The confusion network units $3_1 \ldots 3_N$ convert into N confusion networks data structures of N digraphs such as a phoneme lattice, a syllable lattice and a word lattice from the speech recognition unit $2_1 \ldots 2_N$. Each of inverted index table creation units $4_1 \ldots 4_N$ has the same configuration as the inverted index table creation unit 4 of the first embodiment. Each of the inverted index table creation units $4_1 \ldots 4_N$ sorts each piece of arc information of each confusion network from each of the confusion network creation units $3_1 \ldots 3_N$ by a label assigned to each arc to create each of N inverted index tables. Each of the inverted index table storing units $5_1 \ldots 5_N$ has the same configuration as the inverted index table storing unit 5 of the first embodiment. The inverted index table storing units $5_1 \ldots 5_N$ store N inverted index tables from the inverted index table creation units $4_1 \ldots 4_N$.

Each of the query conversion units $7_1 \ldots 7_N$ has the same configuration as the query conversion unit 7 of the first embodiment. The query conversion units $7_1 \ldots 7_N$ convert a character string input as a query into N label strings. Each of the label string check units $8_1 \ldots 8_N$ has the same configuration as the label string check unit 8 of the first embodiment. The label string check units $8_1 \ldots 8_N$ calculate N intersections between N graphs of label strings created in the query conversion units $7_1 \ldots 7_N$ and N partial confusion networks created based on N confusion networks created in the confusion network creation units $3_1 \ldots 3_N$.

The retrieval result integration unit 20 reads one or more retrieval result lists obtained in the label string check units $8_1 \ldots 8_N$ and integrates them to create one retrieval result list. In a case where the retrieval result integration unit 20 reads two or more retrieval result lists, the retrieval result integration unit 20 checks whether or not there are two or more pairs in which the same utterance ID numbers of label strings are included, in a process of integrating these retrieval result lists. If there are two or more pairs in which the same utterance ID numbers of label strings are included, the retrieval result integration unit 20 remains one pair in which an appearance probability of label string has the highest value and deletes other one or more pairs. Then, the retrieval result integration unit 20 obtains based on the one retrieval result list one or more pointers that indicate one or more addresses in the speech database 1 in which one or more pieces of speech data corresponding to the label string of query are stored, outputs the obtained list of pointers to the retrieval result output unit 9. The retrieval result output unit 9 reads the list of pointers obtained in the retrieval result integration unit 20. Then, the retrieval result output unit 9 extracts speech data information corresponding to the label string of query from the speech database 1 based on the read list of pointers, and outputs the extracted speech data information to a display.

With reference to FIG. 18, we will describe one example of speech data retrieval method of the present embodiment.

In step S91, the speech recognition unit $2_i$ ($1 \leq i \leq N$) reads speech data from the speech database 1 and outputs to the confusion network creation unit $3_i$ ($1 \leq i \leq N$) plural candidates for the results of speech recognition in digraph type data structure corresponding thereto, with reference to an acoustic model, a pronunciation dictionary and a language model. In step S92, the confusion network creation unit $3_i$ converts a diagraph corresponding to the speech recognition unit $2_i$ into a confusion network and then outputs the confusion network to the inverted index table creation unit $4_i$ ($1 \leq i \leq N$). In step S93, the inverted index table creation unit $4_i$ creates an inverted index table based on the confusion network and then outputs the inverted index table to the inverted index table storing unit $5_i$ ($1 \leq i \leq N$). In step S94, the query input unit 6 receives an input of query from a user. In step S95, the query conversion unit $7_i$ ($1 \leq i \leq N$) converts a character string input as a query into a corresponding label string with reference to itself dictionary. It is noted that the processes of steps S94 and S95 may be carried out before the process of step S91 or be carried out at the same time as those of steps S91 to S93.

In step S96, the label string check unit $8_i$ ($1 \leq i \leq N$) reads the label string of query from the query conversion unit $7_i$ and the inverted index table stored in the inverted index table storing unit $5_i$. In step S97, the label string check unit $8_i$ creates a partial confusion network formed by only arcs corresponding to one or more labels, which form the label string of query, and the special label "@", with reference to the label string of query and the inverted index table. In step S98, the label string check unit $8_i$ creates a graph of query based on the label string of query. In step S99, the label string check unit $8_i$ calculates an intersection between the graph of query and the partial confusion network to create a graph. In step S100, the label string check unit $8_i$ calculates a value of summation of appearance probabilities with respect to all paths from a starting node to an ending node in the graph created in step S99 and regards the calculated value as an appearance probability of label string of query. In step S101, the label string check unit $8_i$ reads an utterance ID number from the inverted index table of the confusion network in which the label string of query is included and registers a pair of the utterance ID number of label string and the appearance probability on a retrieval result list. In step S102, the retrieval result integration unit 20 reads one or more retrieval result lists obtained in the label string check units $8_1 \ldots 8_N$, integrates them to create one retrieval result list, obtains based on the one retrieval result list one or more pointers that indicate one or more addresses in the speech database 1 in which one or more pieces of speech data corresponding to the label string of query are stored, and outputs the obtained list of pointers to the retrieval result output unit 9. In step S103, the retrieval result output unit 9 reads the list of pointers obtained in the retrieval result integration unit 20 and extracts speech data information corresponding to the label string of query from the speech database 1 based on the read list of pointers. In step S104, the retrieval result output unit 9 outputs the extracted speech data information to the display.

The advantageous features of the speech data retrieval apparatus 30 will be described below.

The speech data retrieval method that the speech data retrieval apparatus 30 carries out can execute parallel speech data retrieval processing using plural label systems, in addition to the advantageous feature of the speech data retrieval method that the speech data retrieval apparatus 10 carries out.

Third Embodiment

With reference to FIGS. 19 to 23, we will describe a third embodiment of the present invention. The speech data retrieval apparatus 20 of the second embodiment independently retrieves speech data by label system. In contrast, a speech data retrieval apparatus 50 of the third embodiment retrieves speech data using a combination network in which all label systems are combined. The speech data retrieval method of the third embodiment is advantageous for a case where a character string input as a query includes therein non-registered words that are not registered on the pronunciation dictionary and the language model in the speech recognition unit 2.

Figure 19:
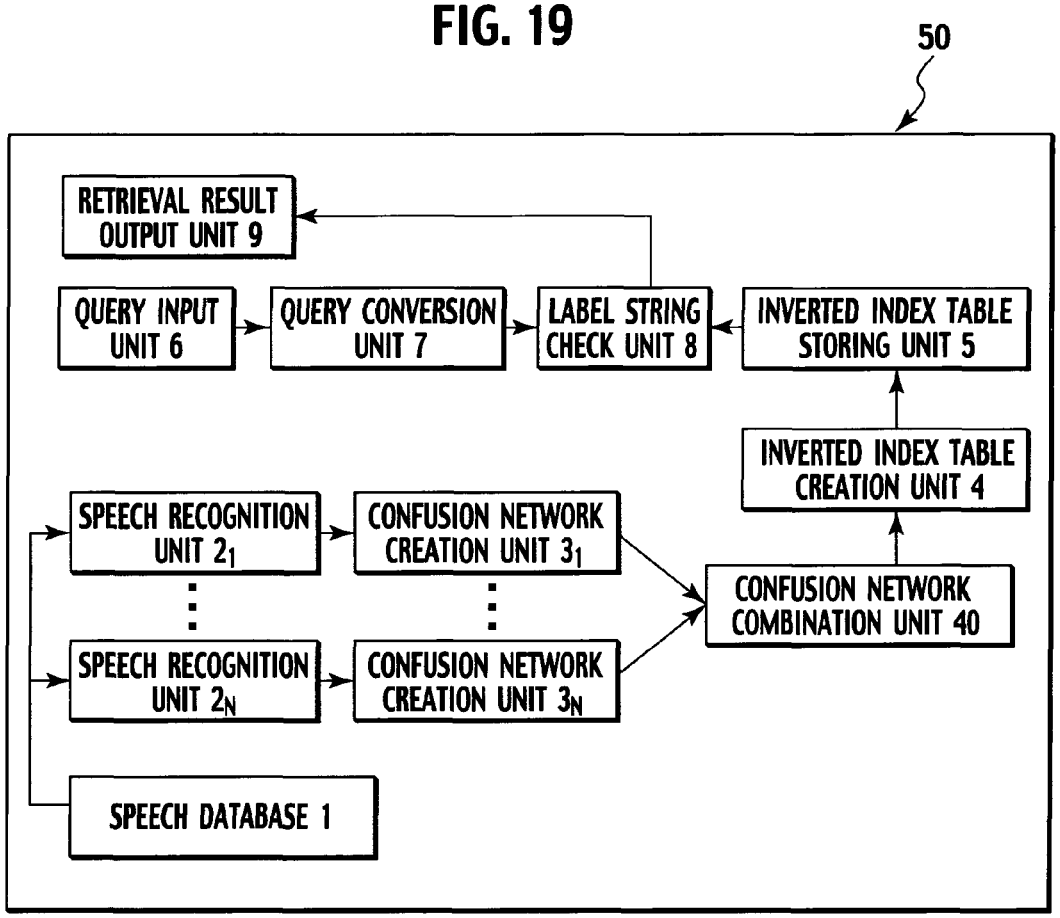
FIG. 19 is a block diagram of a speech data retrieval apparatus according to a third embodiment of the present invention.

As shown in FIG. 19, the speech data retrieval apparatus 50 comprises the speech database 1, the speech recognition units $2_1 \ldots 2_N$, the confusion network creation units $3_1 \ldots 3_N$, the inverted index table creation unit 4, the inverted index table storing unit 5, the query input unit 6, the query conversion unit 7, the label string check unit 8, the retrieval result output unit 9 and a confusion network combination unit 40. For example, if the speech data retrieval apparatus 50 retrieves speech data by using two kinds of digraphs (a phoneme lattice and a word lattice), the speech data retrieval apparatus 50 has the speech recognition units $2_1$, $2_2$ and the confusion network creation units $3_1$, $3_2$.

The speech recognition unit $2_i$ ($1 \leq i \leq N$) is connected to the speech database 1. The confusion network creation unit $3_i$ ($1 \leq i \leq N$) is connected to the speech recognition unit $2_i$ and the confusion network combination unit 40. The inverted index table creation unit 4 is connected to the confusion network combination unit 40 and the inverted index table storing unit 5.

Each of the speech recognition units $2_1 \ldots 2_N$ has the same configuration as the speech recognition unit 2 of the first embodiment. N digraphs used in the speech recognition units $2_1 \ldots 2_N$ differs one another. The speech recognition units $2_1 \ldots 2_N$ read speech data from the speech database 1 and carry out speech recognition processes. Each of the confusion network units $3_1 \ldots 3_N$ has the same configuration as the confusion network unit 3 of the first embodiment. The confusion network units $3_1 \ldots 3_N$ convert into N confusion networks data structures of N digraphs such as a phoneme lattice, a syllable lattice and a word lattice from the speech recognition unit $2_1 \ldots 2_N$.

The confusion network combination unit 40 combines N confusion networks from the confusion network units $3_1 \ldots 3_N$ to create a combination network. For example, if the speech data retrieval apparatus 50 retrieves speech data by using two kinds of digraphs (a phoneme lattice and a word lattice), the speech data retrieval apparatus 50 combines a phoneme confusion network (or a word confusion network) from the confusion network creation unit $3_1$ and a word confusion network (or a phoneme confusion network) from the confusion network creation unit $3_2$ to create a word-phoneme combination network. The inverted index table creation unit 4 sorts each piece of arc information of the combination network from the confusion network combination unit 40 by label assigned to each arc to create an inverted index table.

The query conversion unit 7 converts a character string input as a query into a label string. For example, if the speech data retrieval apparatus 50 retrieves speech data by using two kinds of digraphs (a phoneme lattice and a word lattice), the query conversion unit 7 first converts a character string input as a query into a word string by using a dictionary. Then, the query conversion unit 7 converts the word string into a label string in which a phoneme and a word are mixed by dealing as a word a word registered on the pronunciation dictionary and the language model used in the speech recognition unit 2 and as a phoneme string a word not registered on the pronunciation dictionary and the language mode used in the speech recognition unit 2.

The label string check unit 8 calculates an intersection between a graph of label string created in the query conversion unit 7 and a partial confusion network created based on the combination network created in the confusion network combination unit 40. Then, the label string check unit 8 obtains based on the retrieval result list S one or more pointers that indicate one or more addresses in the speech database 1 in which one or more pieces of speech data corresponding to the label string of query are stored and outputs the obtained list of pointers to the retrieval result output unit 9. For example, if the speech data retrieval apparatus 50 retrieves speech data by using two kinds of digraphs (a phoneme lattice and a word lattice), the label string check unit 8 calculates an intersection between a graph of label string created in the query conversion unit 7 and a partial confusion network created based on the word-phoneme combination network created in the confusion network combination unit 40.

With reference to FIGS. 20 to 22C, we will describe one example of a method for creating a combination network in the confusion network combination unit 40. We assume that the confusion network combination unit 40 receives a phoneme confusion network shown in FIG. 21A from the confusion network creation unit $3_1$ and a word confusion network shown in FIG. 21B from the confusion network creation unit $3_2$, where phonetic representations of word A are symbols "a1", "a2" and "a3", phonetic representations of word B are symbols "b1" and "b2" and phonetic representation of word C is a symbol "c1".

Figure 22A:
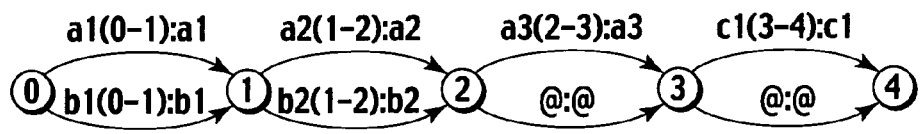
FIG. 22A is a first finite state transducer according to the third embodiment of the present invention.
Figure 22B:
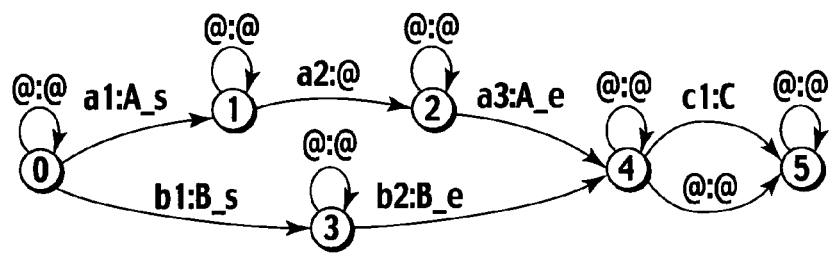
FIG. 22B is a second finite state transducer according to the third embodiment of the present invention.

In step S111, the confusion network combination unit 40 converts each phoneme label of the phoneme confusion network into a pair of an input label and an output label, and then creates a first finite state transducer based on the phoneme confusion network (see FIG. 22A). The input label is composed of a phoneme label and source and destination node numbers of an arc to which the phoneme label is assigned. The output label is composed of a phoneme label. The first finite state transducer is a digraph that has a pair of an input label and an output label as a label of each arc. The first finite state transducer represents a conversion rule of label string as a model for converting an input label string representing a feasible path from a starting node to an ending node thereof into an output label string corresponding to the input label string. For example, in the phoneme confusion network shown in FIG. 21A, a phoneme label "a3" is converted into a pair "a3(2-3):a3" of an input label and an output label because the numbers of source and destination nodes of arc to which the phoneme label "a3" is assigned are "2" and "3". It is noted that a mark ":" is inserted to separate between the input and output labels.

In step S112, the confusion network combination unit 40 respectively converts a word label of the word confusion network and an arc of the word label into a phoneme string label which represents how to pronounce the word and one or more arcs to which one or more phoneme labels forming the phoneme string label are assigned. A node is replaced between two adjacent arcs to which phoneme labels are assigned. The confusion network combination unit 40 further converts each phoneme label into a pair of input and output labels, and then creates a second finite state transducer based on the word confusion network (see FIG. 22B). The input label is composed of a phoneme label. The output label is composed of a word label and positional information (a first phoneme of word, a final phoneme of word, or a phoneme appearing at a position other than the first and final positions of word) of the word label. For example, if the first phoneme of word "A" is a phoneme "a1", an arc of the second finite state transducer is represented by a pair "a1:A_s" of an input label to which the phoneme "a1" is assigned and an output label to which a symbol "A_s" representing a combination of the word "A" and a symbol "_s" which indicates a first position of the word "A" is assigned. If the final phoneme of word "A" is a phoneme "a3", an arc of the second finite state transducer is represented by a pair of "a3:A_e" of an input label to which the phoneme "a3" is assigned and an output label to which a symbol "A_e" representing a combination of the word "A" and a symbol "_e" which indicates a final position of the word "A" is assigned. If the phoneme appearing at a position other than the first and final positions of word "A" is a phoneme "a2", an arc of the second finite state transducer is represented by a pair of "a2:@" of an input label to which the phoneme "a2" is assigned and an output label to which a symbol "@" is assigned. If the first and final phoneme of word "C" is a phoneme "c1" (that is, a pronunciation is one phoneme), an arc of the second finite state transducer is represented by a pair of "c1:C" of an input label to which the phoneme "c1" is assigned and an output label to which the word "C" is assigned. The confusion network combination unit 40 also adds an arc, which comes in a source node thereof, to each node of the second finite state transducer and then assigns a label "@:@" to the added arc.

Figure 22C:
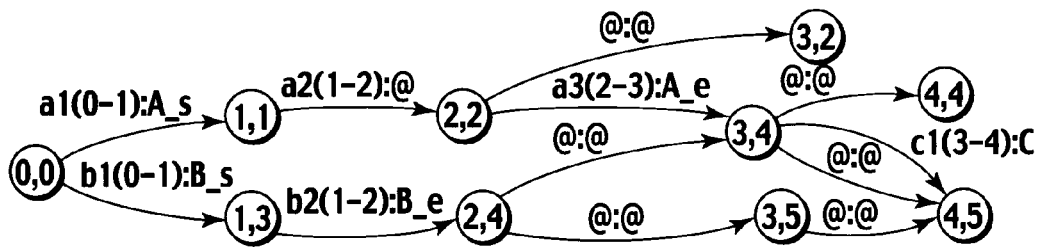
FIG. 22C is a third finite state transducer according to the third embodiment of the present invention.

In step S113, the confusion network combination unit 40 combines the first finite state transducer and the second finite state transducer, according to an algorithm for calculating a combination of two graphs, to create a third finite state transducer (see FIG. 22C). More specifically, the confusion network combination unit 40 associates each path of the first finite state transducer with each path of the second finite state transducer so that the output label string of the first finite state transducer coincides the input label string of the second finite state transducer, to combine the first finite state transducer with the second finite state transducer. Each node of the third finite state transducer has a pair of the node number corresponding to the first finite state transducer and the node number corresponding to the second finite state transducer. Each arc of the third finite state transducer has a label which includes a pair of the positional information of phoneme and the positional information of words.

Here, we will describe an algorithm for combining two graphs G1 and G2. The algorithm is as follows,

| Composition (G1, G2) |
| --- |
| 1   V←I1*I2 |
| 2   S←I1*I2 |
| 3   while S≠Φ do |
| 4       (v1, v2)←HEAD(S) |
| 5       DEQUEUE(S) |
| 6       if (v1, v2) ∈ I1*I2 then |
| 7           I←I∪{(v1, v2)} |
| 8       if (v1, v2) ∈ F1*F2 then |
| 9           F←F∪{(v1, v2)} |
| 10      for each (e1, e2) ∈E[v1]*E[v2] such that o[e1]=i[e2] do |
| 11          if not (n[e1], n[e2]) ∈V then |
| 12              V←V∪{(n[e1], n[e2])} |
| 13              ENQUEUE(S, (n[e1], n[e2])) |
| 14          E←E∪{((v1, v2), (n[e1], n[e2]), i[e1], o[e2])} |
| 15   return G | where the graph G has a set V of nodes, a set H of arcs, a set I of starting node and a set F of ending node, a set H(v) of arcs is a set of arcs coming in a node v, k[e] is a source node of arc e, n[e] is a destination node of arc e, i[e] is an input label of arc e, o[e] is an output label of arc e, HEAD(S) is a function for returning a head element of queue S, DEQUEUE(S) is a function for deleting a head element of queue S, and ENQUEUE(S, x) is a function for inserting an element x into an end position of queue S. Two graphs G1 and G2 represent finite state transducers. In order to distinguish nodes and arcs corresponding to two graphs G1 and G2, suffixes "1" and "2" are assigned to each alphabet.

Figure 21A:
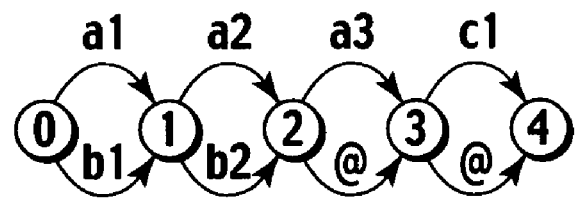
FIG. 21A is a phoneme confusion network according to the third embodiment of the present invention.
Figure 21B:
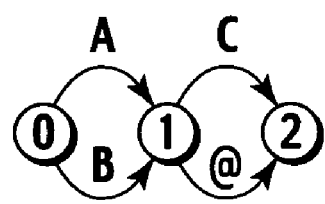
FIG. 21B is a word confusion network according to the third embodiment of the present invention.
Figure 21C:
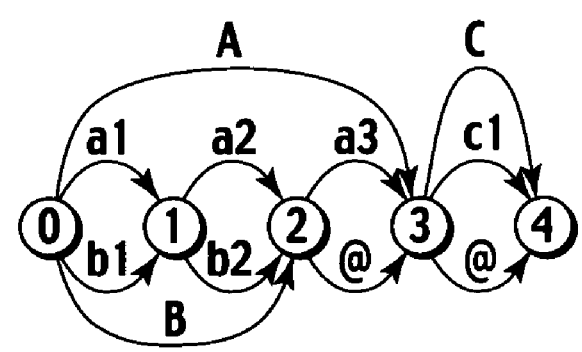
FIG. 21C is a word-phoneme combination network according to the third embodiment of the present invention.

In step S114, the confusion network combination unit 40 creates a word-phoneme combination network based on the third finite state transducer (see FIG. 21C). For example, a label "a1(0-1):A_s" of the third finite state transducer indicates that the phoneme "a1" is a label of arc between the node "0" and the node "1" in the phoneme confusion network and is the first phoneme of word "A". A label "a3(2-3):A_e" of the third finite state transducer indicates that the phoneme "a3" is a label of arc between the node "2" and the node "3" in the phoneme confusion network and is the final phoneme of word "A". Therefore, the confusion network combination unit 40 can arrange an arc to which a label of word "A" is assigned in the word confusion network between the node "0" and the node "3" in the phoneme confusion network. Further, a label "c1(3-4):C" of the third finite state transducer indicates that the phoneme "c1" is a label of arc between the node "3" and the node "4" in the phoneme confusion network and is the first and final phoneme of word "C". Therefore, the confusion network combination unit 40 can arrange an arc to which a label of word "C" is assigned in the word confusion network between the node "3" and the node "4" in the phoneme confusion network. Thus, in the word-phoneme combination network, arcs in the word confusion network are added to the phoneme confusion network without changing an order relation of word, and a path representing how to pronounce a word (a phoneme string) is included between a source node and a destination node of arc of the word.

In a case where the speech data retrieval apparatus 50 retrieves a word string "BD" as a query wherein a word "D" is a non-registered word and is pronounced as "a3, c1", the label string check unit 8 deals the registered word "B" as a word and the non-registered word "D" as a phoneme string "a3" and "c1". The label string check unit 8 can retrieve the word string "BD" as a query because a label string "B", "a3" and "c1" is included in one of paths of the word-phoneme combination network shown in FIG. 21C.

With reference to FIG. 23, we will describe one example of speech data retrieval method of the present embodiment.

In step S121, the speech recognition unit $2_i$ ($1 \leq i \leq N$) reads speech data from the speech database 1 and outputs to the confusion network creation unit $3_i$ ($1 \leq i \leq N$) plural candidates for the results of speech recognition in digraph type data structure corresponding thereto, with reference to an acoustic model, a pronunciation dictionary and a language model. In step S122, the confusion network creation unit $3_i$ converts a diagraph corresponding to the speech recognition unit $2_i$ into a confusion network and then outputs the confusion network to the confusion network combination unit 40. In step S123, the confusion network combination unit 40 combines N confusion networks from the confusion network creation units $3_1 \ldots 3_N$ to create a combination network, and then outputs the combination network to the inverted index table creation unit 4. In step S124, the inverted index table creation unit 4 creates an inverted index table based on the combination network and then outputs the inverted index table to the inverted index table storing unit 5. In step S125, the query input unit 6 receives an input of query from a user. In step S126, the query conversion unit 7 converts a character string input as a query into a corresponding label string with reference to itself dictionary. It is noted that the processes of steps S125 and S126 may be carried out before the process of step S121 or be carried out at the same time as those of steps S121 to S124.

In step S127, the label string check unit 8 reads the label string of query from the query conversion unit 7 and the inverted index table stored in the inverted index table storing unit 5. In step S128, the label string check unit 8 creates a partial confusion network formed by only arcs corresponding to one or more labels, which form the label string of query, and the special label "@", with reference to the label string of query and the inverted index table while dealing a registered word as a word and a non-registered word as a phoneme string. In step S129, the label string check unit 8 creates a graph of query based on the label string of query while dealing a registered word as a word and a non-registered word as a phoneme string. In step S130, the label string check unit 8 calculates an intersection between the graph of query and the partial confusion network to create a graph. In step S131, the label string check unit 8 calculates a value of summation of appearance probabilities with respect to all paths from a starting node to an ending node in the graph created in step S130 and regards the calculated value as an appearance probability of label string of query. In step S132, the label string check unit 8 reads an utterance ID number from the inverted index table of the confusion network in which the label string of query is included and registers a pair of the utterance ID number of label string and the appearance probability on a retrieval result list. In step S133, the label string check unit 8 obtains based on the retrieval result list one or more pointers that indicate one or more addresses in the speech database 1 in which one or more pieces of speech data corresponding to the label string of query are stored, and outputs the obtained list of pointers to the retrieval result output unit 9. In step S134, the retrieval result output unit 9 reads the list of pointers obtained in the label string check unit 8 and extracts speech data information corresponding to the label string of query from the speech database 1 based on the read list of pointers. In step S135, the retrieval result output unit 9 outputs the extracted speech data information to the display.

The advantageous features of the speech data retrieval apparatus 50 will be described below.

The speech data retrieval method that the speech data retrieval apparatus 50 carries out can retrieve speech data even if both of a registered word and a non-registered word are included in a query, in addition to the advantageous feature of the speech data retrieval method that the speech data retrieval apparatus 10.

In a case of carrying out speech recognition bases on a word as a label, if a non-registered word is included in a query, the non-registered word is not correctly recognized by the conventional speech data retrieval apparatus and does not also appear in a confusion network. Therefore, if a non-registered word is included in a query, the non-registered word prevents the conventional speech data retrieval apparatus from retrieving speech data. On the other hand, in a case of carrying out speech recognition based on a phoneme as a label, the conventional speech data retrieval apparatus checks a label string after converting all words included in a query into a phoneme string. Therefore, even if a non-registered word is included in a query, the conventional speech data retrieval apparatus has a possibility of the retrieval of speech data. However, if a word is converted into a phonetic representation such as a phoneme string, the conventional speech data retrieval apparatus has a possibility of less-accuracy of the retrieval of speech data because it can not distinguish between homophones (a word that is pronounced like another word but has a different spelling or meaning).

The above-described problem is resolved by dealing a registered word included in a query as a word and a non-registered word included in the query as a phoneme string according to the present embodiment.

INDUSTRIAL APPLICABILITY

The speech data retrieval apparatus, the speech data retrieval method and the speech data retrieval program have the following advantageous features: (1) the file size of inverted index table can be reduced; (2) speech data can be retrieved with high-accuracy without being constrained by a language model used in speech recognition; and (3) the inverted index table can be effectively retrieved when using a confusion network created to reduce the file size of inverted index table.

The invention claimed is:

1. A speech data retrieval apparatus comprising:
   a speech database including plural pieces of speech data therein;
   a speech recognition unit configured to read speech data from the speech database, carry out a speech recognition process with respect to the read speech data, and output a result of speech recognition process as a lattice in which a phoneme, a syllable, or a word is a base unit;
   a confusion network creation unit configured to create a confusion network based on the lattice from the speech recognition unit and output the result of speech recognition process as the confusion network;
   an inverted index table creation unit configured to create an inverted index table based on the confusion network from the confusion network creation unit;
   a query input unit configured to receive a query input by a user, carry out a speech recognition process with respect to the received query, and output a result of speech recognition process as a character string;
   a query conversion unit configured to convert the character string from the query input unit into a label string in which a phoneme, a syllable, or a word is a base unit; and
   a label string check unit configured to check the label string from the query conversion unit against the inverted index table from the inverted index table creation unit, retrieve speech data which is included in both of the label string and the speech database, and output a list of pointer which indicates an address in the speech database in which the retrieved speech data is stored.

2. The speech data retrieval apparatus according to claim 1, wherein the label string check unit creates a partial confusion network formed by one or more arcs assigned to one or more labels included in the label string, with reference to the inverted index table, represents the label string by one-dimensional array graph and then assigns to each node in the one-dimensional array graph an arc returning to the each node to create a graph of query, and calculates an intersection between the partial confusion network and the graph of query.

3. A speech data retrieval apparatus comprising:
   a speech database including plural pieces of speech data therein;
   two or more speech recognition units each of which is configured to read speech data from the speech database, carry out a speech recognition process with respect to the read speech data, and output a result of speech recognition process as a lattice in which a phoneme, a syllable, or a word is a base unit, wherein a base unit of lattice output from one speech recognition unit differs from one output from another speech recognition unit;

two or more confusion network creation units respectively connected to the two or more speech recognition unit, wherein each confusion network creation unit is configured to create a confusion network based on the lattice from the corresponding speech recognition unit and output the result of speech recognition process as the confusion network;

two or more inverted index table creation units respectively connected to the two or more confusion network creation units, wherein each inverted index table creation unit is configured to create an inverted index table based on the confusion network from the corresponding confusion network creation unit;

a query input unit configured to receive a query input by a user, carry out a speech recognition process with respect to the received query, and output a result of speech recognition process as a character string;

two or more query conversion units each of which is configured to convert the character string from the query input unit into a label string in which a phoneme, a syllable, or a word is a base unit, wherein a base unit of label string converted in one query conversion unit differs from one converted in another query conversion unit;

two or more label string check units respectively connected to the two or more inverted index table creation units and the two or more query conversion units, wherein each label string check unit is configured to check the label string from the corresponding query conversion unit against the inverted index table from the corresponding inverted index table creation unit, and retrieve speech data which is included in both of the label string and the speech database; and a retrieval result integration unit configured to read retrieval results from the two or more label string check units, integrate the read retrieval results to create a retrieval result list, and output a list of pointer which indicates an address in the speech database in which speech data included in the retrieval result list is stored.

4. A speech data retrieval apparatus comprising:

a speech database including plural pieces of speech data therein;

two or more speech recognition units each of which is configured to read speech data from the speech database, carry out a speech recognition process with respect to the read speech data, and output a result of speech recognition process as a lattice in which a phoneme, a syllable, or a word is a base unit, wherein a base unit of lattice output from one speech recognition unit differs from one output from another speech recognition unit;

two or more confusion network creation units respectively connected to the two or more speech recognition unit, wherein each confusion network creation unit is configured to create a confusion network based on the lattice from the corresponding speech recognition unit and output the result of speech recognition process as the confusion network;

a confusion network combination unit configured to combine confusion networks from the two or more confusion network creation units to create a combination network, and output the combination network;

an inverted index table creation unit configured to create an inverted index table based on the combination network from the confusion network combination unit;

a query input unit configured to receive a query input by a user, carry out a speech recognition process with respect to the received query, and output a result of speech recognition process as a character string;

a query conversion unit configured to convert the character string from the query input unit into a label string in which two or more of a phoneme, a syllable, and a word are a base unit;

a label string check unit configured to check the label string from the query conversion unit against the inverted index table from the inverted index table creation unit, retrieve speech data which is included in both of the label string and the speech database, and output a list of pointer which indicates an address in the speech database in which the retrieved speech data is stored.

5. A speech data retrieval method comprising:

reading speech data from a speech database which includes plural pieces of speech data therein;

carrying out a speech recognition process with respect to the read speech data;

outputting a result of speech recognition process as a lattice in which a phoneme, a syllable, or a word is a base unit;

creating a confusion network based on the output lattice;

outputting the result of speech recognition process as the confusion network;

creating an inverted index table based on the output confusion network;

receiving a query input by a user;

carrying out a speech recognition process with respect to the received query;

outputting a result of speech recognition process as a character string;

converting the output character string into a label string in which a phoneme, a syllable, or a word is a base unit;

checking the label string against the inverted index table;

retrieving speech data which is included in both of the label string and the speech database; and outputting a list of pointer which indicates an address in the speech database in which the retrieved speech data is stored.

6. A non-transitory computer usable medium having a computer readable speech data retrieval program embodied therein, the computer readable speech data retrieval program comprising:

a first speech data retrieval program code for causing a computer to read speech data from a speech database which includes plural pieces of speech data therein;

a second speech data retrieval program code for causing the computer to carry out a speech recognition process with respect to the read speech data;

a third speech data retrieval program code for causing the computer to output a result of speech recognition process as a lattice in which a phoneme, a syllable, or a word is a base unit;

a fourth speech data retrieval program code for causing the computer to create a confusion network based on the output lattice;

a fifth speech data retrieval program code for causing the computer to output the result of speech recognition process as the confusion network;

a sixth speech data retrieval program code for causing the computer to create an inverted index table based on the output confusion network;

a seventh speech data retrieval program code for causing the computer to receive a query input by a user;

an eighth speech data retrieval program code for causing the computer to carry out a speech recognition process with respect to the received query;

a ninth speech data retrieval program code for causing the computer to output a result of speech recognition process as a character string;

a tenth speech data retrieval program code for causing the computer to convert the output character string into a label string in which a phoneme, a syllable, or a word is a base unit;

an eleventh speech data retrieval program code for causing the computer to check the label string against the inverted index table;

a twelfth speech data retrieval program code for causing the computer to retrieve speech data which is included in both of the label string and the speech database; and a thirteenth speech data retrieval program code for causing the computer to output a list of pointer which indicates an address in the speech database in which the retrieved speech data is stored.

* * * * *